(12) United States Patent
Kim et al.

(10) Patent No.: US 10,706,974 B2
(45) Date of Patent: Jul. 7, 2020

(54) PASSIVE COOLING SYSTEM OF CONTAINMENT BUILDING AND NUCLEAR POWER PLANT COMPRISING SAME

(71) Applicant: KOREA ATOMIC ENERGY RESEARCH INSTITUTE, Daejeon (KR)

(72) Inventors: Young In Kim, Daejeon (KR); Cheon Tae Park, Daejeon (KR); Seung Yeob Ryu, Daejeon (KR); Young Min Bae, Daejeon (KR); Joo Hyung Moon, Daejeon (KR); Soo Jai Shin, Daejeon (KR); Hun Sik Han, Seoul (KR); Kyung Jun Kang, Daejeon (KR); Young Soo Kim, Seoul (KR); Tae Wan Kim, Daejeon (KR); Ju Hyeon Yoon, Daejeon (KR); Keung Koo Kim, Daejeon (KR); Jae Joo Ha, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 449 days.

(21) Appl. No.: 15/100,224

(22) PCT Filed: Dec. 2, 2014

(86) PCT No.: PCT/KR2014/011711
§ 371 (c)(1),
(2) Date: May 27, 2016

(87) PCT Pub. No.: WO2015/084027
PCT Pub. Date: Jun. 11, 2015

(65) Prior Publication Data
US 2017/0004892 A1     Jan. 5, 2017

(30) Foreign Application Priority Data

Dec. 3, 2013   (KR) ........................ 10-2013-0149403

(51) Int. Cl.
G21C 9/012     (2006.01)
G21C 15/18     (2006.01)
G21C 9/004     (2006.01)

(52) U.S. Cl.
CPC ............. *G21C 9/012* (2013.01); *G21C 9/004* (2013.01); *G21C 15/18* (2013.01); *Y02E 30/40* (2013.01)

(58) Field of Classification Search
CPC ...... G21C 15/18; G21C 9/012; G21C 13/022; F21B 1/02; F28D 9/00; F28D 9/0006;
(Continued)

(56) References Cited

U.S. PATENT DOCUMENTS 3,190,808 A * 6/1965 Dodd ..................... G21C 15/18
                                                        122/32
3,631,923 A * 1/1972 Izeki ........................ F28B 1/02
                                                        165/167
(Continued)

FOREIGN PATENT DOCUMENTS

KR    2002-0037105        5/2002
KR    10-2006-00200756    3/2006
(Continued)

OTHER PUBLICATIONS

International Search Report for PCT/KR2014/011711, dated Mar. 20, 2015, 4 pages.

*Primary Examiner* — Sharon M Davis
(74) *Attorney, Agent, or Firm* — Scully Scott Murphy and Presser

(57) ABSTRACT

The present invention discloses a passive cooling system of a containment building, to which a plate-type heat
(Continued)

exchanger is applied. A passive cooling system of a containment building comprises: a containment building; a plate-type heat exchanger provided to at least one of the inside and the outside of the containment building and comprising channels respectively provided to the both sides of a plate so as to be arranged dividedly from each other such that the plate-type heat exchanger carries out mutual heat exchange between the internal atmosphere of the containment building and a heat exchange fluid while maintaining a pressure boundary; and a pipe connected to the plate-type heat exchanger by penetrating the containment building so as to form the path of the internal atmosphere of the containment building or the heat exchange fluid.

8 Claims, 20 Drawing Sheets

(58) Field of Classification Search
CPC ......... F28D 9/0037; F28F 13/06; F28F 13/08; F28F 13/14
USPC .......................................................... 165/166
See application file for complete search history.

(56) References Cited

U.S. PATENT DOCUMENTS

| | | | |
|---|---|---|---|
| 4,249,595 A | 2/1981 | Butt | |
| 4,503,908 A * | 3/1985 | Rosman | F28D 9/0018 165/167 |
| 5,112,569 A * | 5/1992 | Cinotti | G21C 1/322 376/282 |
| 5,282,230 A * | 1/1994 | Billig | G21C 9/004 376/283 |
| 5,612,982 A * | 3/1997 | Woodcock | G21C 15/18 376/298 |
| 5,761,262 A * | 6/1998 | No | G21C 9/012 376/283 |
| 7,680,237 B1 * | 3/2010 | Meseth | G21C 9/004 376/277 |
| 2004/0013585 A1 * | 1/2004 | Whyatt | B01B 1/005 422/177 |
| 2011/0314858 A1 * | 12/2011 | Tahara | G21C 9/004 62/259.1 |

FOREIGN PATENT DOCUMENTS

| | | |
|---|---|---|
| KR | 10-1242743 | 3/2013 |
| WO | WO-2012/176336 | 12/2012 |

* cited by examiner

PASSIVE COOLING SYSTEM OF CONTAINMENT BUILDING AND NUCLEAR POWER PLANT COMPRISING SAME

CROSS-REFERENCE TO RELATED APPLICATIONS

This application is the national phase of PCT application PCT/KR2014/011711 having an international filing date of 2 Dec. 2014, which claims the benefit of earlier filing date and right of priority to Korean Application No. 10-2013-0149403, filed on 3 Dec. 2013, the contents of which are incorporated by reference herein in their entirety.

BACKGROUND OF THE INVENTION

1. Field of the Invention

The present disclosure relates to a passive cooling system of a containment building to which a plate-type heat exchanger is applied and a nuclear power plant including the same.

2. Description of the Related Art

Reactors are divided into active reactors using active power such as a pump and passive reactors using passive power such as gravity force, gas pressure according to the configuration method of a safety system. Furthermore, reactors are divided into loop type reactors (for example, Korean pressurized water reactor) in which a main component (a steam generator, a pressurizer, a pump impeller, etc.) is installed at an outside of the reactor vessel and integrated type reactors (for example, SMART reactor) in which the main component is installed at an inside of the reactor vessel according to the installation location of the main component.

In the nuclear power plant industry, a passive containment building cooling system (or containment building cooling system) has been mostly used as a system for condensing steam and cooling internal atmosphere in order to maintain the integrity of the containment building when coolant or steam is discharged to increase a pressure within the containment building (or reactor building, containment vessel, safety guard vessel) due to the occurrence of a loss of coolant accident or steam line break accident in various reactors including an integrated type reactor.

For a method of being used with the purpose similar to that of the passive containment building cooling system, a method of using a suppression tank for guiding steam discharged to a containment building to the suppression tank (commercial BWR, CAREM: Argentina, IRIS: Westinghouse Company), a method of applying a steel containment to cool (spray, air) an external vessel (AP1000: Westinghouse), and a method of using a heat exchanger (SWR1000: France Framatome ANP, AHWR: India, SBWR: GE), and the like are used. For a heat exchanger of the containment building cooling system, a shell and tube type heat exchanger or condenser (SBWR: U.S. GE Company) is mostly applied thereto. In general, a containment structure for protecting an outside of the reactor vessel (or reactor coolant system of a loop type reactor) is referred to as a containment building (or reactor building) when fabricated and constructed using reinforced concrete, and referred to as a containment vessel (safety guard vessel in case of a small size) when fabricated and constructed using steel.

The performance of a heat exchanger in a containment building cooling system mainly depends on a condensation phenomenon of steam. When atmosphere is not efficiently circulated, steam may not be efficiently supplied thereto, thereby reducing the performance of the heat exchanger. Furthermore, a lot of devices and structures may be disposed within a containment building in a nuclear power plant in which a containment building cooling heat exchanger is disposed within a containment building, and thus there is a difficulty in the layout, and thus reduction in size and weight is required.

SUMMARY OF THE INVENTION

An object of the present disclosure is to provide a passive containment building cooling system for overcoming the defect of a plate type heat exchanger and solving a problem such as flow instability or the like occurring in applying the plate type heat exchanger, and a nuclear power plant including the same.

Another object of the present disclosure is to propose a passive containment building cooling system for providing an intermediate flow path to a fluid flow path at a lower heat exchange performance side in applying the plate type heat exchanger to enhance the heat exchange performance, and a nuclear power plant including the same.

Still another object of the present disclosure is to propose a passive containment building cooling system for cooling the containment building in a passive manner, and safely injecting condensate collected during the cooling process into a reactor coolant system, and a nuclear power plant including the same.

In order to accomplish an object of the foregoing aspects, a passive containment building cooling system according to an embodiment of the present disclosure may include a containment building, a plate type heat exchanger installed on at least one place of an inside and an outside of the containment building, and provided with channels arranged to be distinguished from one another at both sides of a plate to exchange heat between atmosphere within the containment building and heat exchange fluid from each other while maintaining a pressure boundary, and a line connected to the plate type heat exchanger through the containment building to form a flow path of the atmosphere within the containment building or the heat exchange fluid.

According to the present disclosure having the foregoing configuration, various structures and methods for increasing a flow resistance of an inlet region may be proposed to solve a flow instability problem or the like of the plate type heat exchanger, thereby applying the plate type heat exchanger to the passive containment building cooling system.

Furthermore, according to the present disclosure, an open type flow path may be provided or a plurality of open type flow paths may be installed together to mitigate a bottleneck phenomenon of an inlet of the plate type heat exchanger, thereby applying the plate type heat exchanger to a passive containment building.

When the plate type heat exchanger is applied to the passive containment building cooling system, it may have durability to a high-temperature, high-pressure environment, thereby facilitating the maintenance of a pressure boundary between a primary fluid and a secondary fluid, allowing reduction in size with a high heat exchange performance to comply with a strict design standard on an earthquake load or the like, and overcoming an environmental condition of the containment building during an accident.

In addition, according to the present disclosure, it may be possible to have an excellent heat exchange performance due to a high integration of the plate type heat exchanger, thereby allowing reduction in weight, allowing reduction in size to greatly mitigate a layout problem within the containment building or the like.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
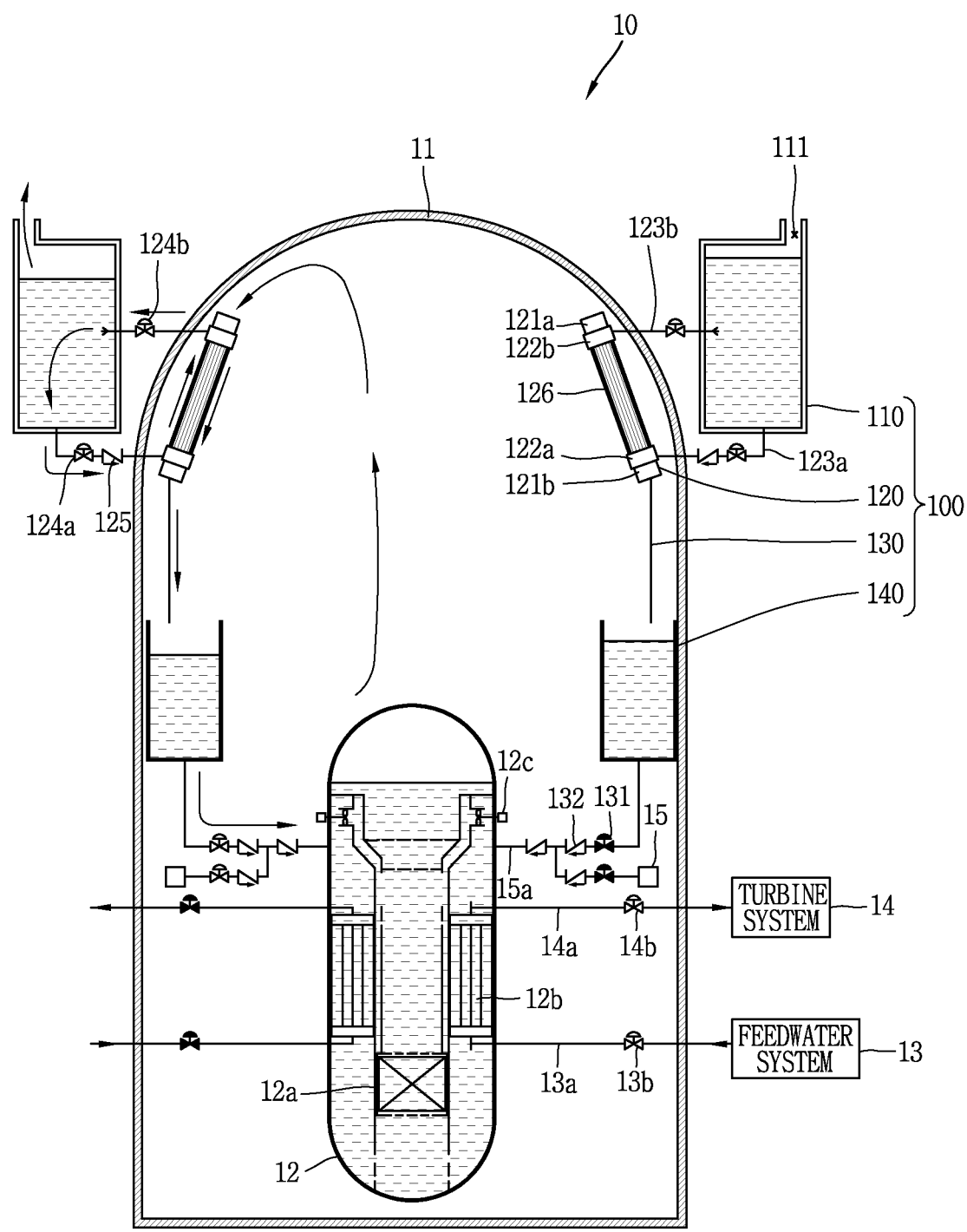
FIG. 1 is a conceptual view illustrating a passive containment building cooling system and a nuclear power plant including the same associated with an embodiment of the present disclosure.

Hereinafter, a passive containment building cooling system associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

A plate type heat exchanger in the present disclosure may refer to all plate type heat exchangers when there is any difference in the processing method or bonding method of a plate thereof as well as a typical plate type heat exchanger and a printed circuit type heat exchanger, unless otherwise specified in particular. Furthermore, a containment building in the present disclosure may collectively refer to a containment building, a reactor building, a containment vessel, a safety guard vessel, and the like, unless otherwise specified in particular.

FIG. 1 is a conceptual view illustrating a passive containment building cooling system 100 and a nuclear power plant 10 including the same associated with an embodiment of the present disclosure.

Referring to FIG. 1, for the sake of convenience of explanation, the passive containment building cooling system 100 and the nuclear power plant 10 including the same disclosed in the present disclosure are symmetrically illustrated around a reactor coolant system 12, wherein a normal operation of the nuclear power plant 10 is illustrated on the right, and the occurrence of an accident at the nuclear power plant 10 is illustrated on the left. It is likewise in the other drawings illustrated to be symmetrical to each other.

The nuclear power plant 10 may include a containment building 11 for surrounding an outside of the reactor coolant system 12 to prevent the leakage of radioactive materials. The containment building 11 is a constituent element commonly referring to a containment vessel, a safety guard vessel and a reactor building.

During a normal operation of the nuclear power plant 10, when feedwater is supplied from a feedwater system 13 to a steam generator 12b through a feedwater line 13a, steam is generated by the steam generator 12b using heat transferred from a reactor core 12a. The steam is supplied to a turbine system 14 through a steam line 14a, and the turbine system 14 produces electricity using the supplied steam. Isolation valves 13b, 14b are open during a normal operation of the nuclear power plant 10, but closed by an actuation signal during the occurrence of an event.

Various safety systems for maintaining the integrity of the nuclear power plant 10 during the occurrence of an accident exist in the nuclear power plant 10, and a safety injection system 15, and the passive containment building cooling system 100 are systems included in the safety systems.

Among them, the passive containment building cooling system 100 is a system for cooling atmosphere within the containment building 11 and condensing steam to reduce a pressure when coolant or steam is discharged to increase a pressure within the containment building 11 due to the occurrence of a loss of coolant accident, a break accident of the steam line 14a, or the like, thereby maintaining the structural integrity of the containment building 11.

The passive containment building cooling system 100 proposed by the present disclosure may include a plate type heat exchanger 120, and may further include an emergency fluid storage section 110 or coolant storage section 130 according to the characteristics of the nuclear power plant 10.

The emergency fluid storage section 110 is formed to store heat exchange fluid therein, and installed at an outside of the containment building 11. The emergency fluid storage section 110 may include an opening portion 111 at an upper portion thereof to discharge heat transferred from atmosphere within the containment building 11 to an outside.

When heat is transferred to the heat exchange fluid of the emergency fluid storage section 110 through heat exchange from atmosphere within the containment building 11, the temperature of the heat exchange fluid increases. Furthermore, the temperature of the heat exchange fluid continuously increases while the heat transfer continues, and the heat exchange fluid evaporates. Steam formed by evaporating the heat exchange fluid is discharged to an outside through the opening portion 111 at an upper portion of the emergency fluid storage section 110, and heat transferred from atmosphere within the containment building 11 by the evaporation of the heat exchange fluid is discharged to an outside by evaporation heat.

The atmosphere within the containment building 11 transfers heat to the heat exchange fluid of the emergency fluid storage section 110, and is cooled and compensated. Accordingly, a pressure increase within the containment building 11 may be suppressed.

The plate type heat exchanger 120 exchanges heat between atmosphere within the containment building 11 and the heat exchange fluid of the emergency fluid storage section 110. The plate type heat exchanger 120 may be installed at least one place of an inside and an outside of the containment building 11, and it is illustrated in FIG. 1 that the plate type heat exchanger 120 is installed in an atmosphere region within the containment building 11.

The plate type heat exchanger 120 may include channels arranged to be distinguished from one another at both sides of a plate between two fluids within the containment building 11 and emergency fluid storage section 110 from each other while maintaining a pressure boundary between an inside and an outside of the containment building 11 to allow the atmosphere of the containment building 11 to pass through a channel at one side and allow the heat exchange fluid of the emergency fluid storage section 110 to pass through a channel at the other side. The plate type heat exchanger 120 may be coupled to a casing 126 surrounding at least part of the plate type heat exchanger 120.

The plate type heat exchanger 120 should induce heat exchange without mixing two fluids to maintain a pressure boundary during the process of exchanging heat between the atmosphere of the containment building 11 and the heat exchange fluid of the emergency fluid storage section 110. To this end, the channels of the plate type heat exchanger 120 may include an atmosphere flow path allowing atmosphere within the containment building 11 to pass therethrough and a fluid flow path for allowing the heat exchange fluid of the emergency fluid storage section 110 to pass therethrough.

When the plate type heat exchanger 120 is installed within the containment building 11, an inlet guide flow path section 121a for guiding the entrainment of atmosphere existing within the plate type heat exchanger 120 to the plate type heat exchanger 120 may be installed in an inlet region of the atmosphere flow path, and an outlet guide flow path section 121b for discharging atmosphere or condensate from the plate type heat exchanger 120 to an inside of the containment building 11 may be installed in an outlet region of the atmosphere flow path. The atmosphere within the containment building 11 is introduced into the plate type heat exchanger 120 through the inlet guide flow path section 121a, and discharged to an inside of the containment building 11 again through the outlet guide flow path section 121b.

The emergency fluid storage section 110 requires a flow path that flows from an outside of the containment building 11 to an inside thereof to pass through the plate type heat exchanger 120. Accordingly, the plate type heat exchanger 120 is connected to the emergency fluid storage section 110 by lines 123a, 123b passing through the containment building 11. The lines 123a, 123b form a flow path for connecting the emergency fluid storage section 110 to the plate type heat exchanger 120.

Since the heat exchange fluid of the emergency fluid storage section 110 is collected to the emergency fluid storage section 110 again subsequent to passing through the channels of the plate type heat exchanger 120, the plate type heat exchanger 120 may include an inlet header 122a and an outlet header 122b for this purpose.

The inlet header 122a is installed in an inlet region of the fluid flow path to distribute heat exchange fluid supplied from the emergency fluid storage section 110 to each fluid flow path. Furthermore, the outlet header 122b is formed in an outlet region of the fluid flow path to collect heat exchange fluid that has passed through the fluid flow path to return to the emergency fluid storage section 110.

The atmosphere within the containment building 11 passing through the plate type heat exchanger 120 is introduced into an inlet of an upper end section of the plate type heat exchanger 120 and discharged to an outlet of a lower end section thereof, and the heat exchange fluid of the emergency fluid storage section 110 passing through the plate type heat exchanger 120 is introduced into an inlet of a lower end section of the plate type heat exchanger 120 and discharged to an outlet of an upper end section thereof. The atmosphere within the containment building 11 transfers heat to the heat exchange fluid of the emergency fluid storage section 110 while passing through the plate type heat exchanger 120, and cools and condenses to descend, and the heat exchange fluid of the emergency fluid storage section 110 receives heat from the atmosphere to ascend while passing through the plate type heat exchanger 120, and returns again to the emergency fluid storage section 110.

The temperature of the heat exchange fluid of the emergency fluid storage section 110 gradually increases by the heat exchange fluid returned to the emergency fluid storage section 110 from the plate type heat exchanger 120, and the heat exchange fluid evaporates during a continuous temperature increase to discharge the transferred heat to an outside using evaporation heat.

The plate type heat exchanger 120 is a passive facility in which a density difference induced from a temperature difference of the fluid is used as actuating power. Accordingly, as long as there exists actuating power due to an increase of atmosphere temperature and pressure within the containment building 11 during the occurrence of an accident, fluid circulation and heat transfer in the plate type heat exchanger 120 is continuously carried out.

The lines 123a, 123b connected between the plate type heat exchanger 120 and emergency fluid storage section 110 pass through the containment building 11, and isolation valves 124a, 124b are installed on the lines 123a, 123b. The isolation valves 124a, 124b may maintain an open state both during a normal operation or the occurrence of an accident of the nuclear power plant 10. However, when a pressure boundary of the containment building 11 is damaged while performing a maintenance work or when the passive containment building cooling system 100 is damaged due to the occurrence of an accident, the isolation valves 124a, 124b are closed by an actuating signal. The check valve 125 may be installed and is open due to a flow during the operation of the passive containment building cooling system 100 to prevent a reverse flow.

The coolant storage section 130 is installed in a downward direction that is advantageous to collecting condensate formed by condensing atmosphere passing trough the plate type heat exchanger 120. The coolant storage section 130 may maintain a state in which at least part of an upper section thereof is open.

The coolant storage section 130 is connected to a safety injection line 15a to use the collected condensate for safety injection to the reactor coolant system 12. The safety injection system 15 is a system for injection coolant into the reactor coolant system 12 to maintain a water level when a loss of coolant accident of the reactor coolant system 12 has occurred, and the safety injection line 15a is connected between the safety injection system 15 and the reactor coolant system 12.

The coolant storage section 130 is connected to the safety injection line 15a to perform a function of the safety injection system 15 during the second-half stage (the latter stage) of an accident in which coolant and condensate stored therein is injected into the reactor coolant system 12 during an accident. When an isolation valve 131 that is opened by an actuating signal during the occurrence of an accident and a check valve 132 that is opened by a flow are opened, and a pressure of the reactor coolant system 12 decreases lower than a water head of the coolant storage section 130 a check valve 132 is opened by a flow, the coolant stored in the coolant storage section 130 and the collected condensate can be injected into the reactor coolant system 12 through the safety injection line 15a, similarly to other safety injection systems 15.

Steam discharged from the reactor coolant system 12 to an inside of the containment building 11 due to the occurrence of an accident is cooled and condensed through heat exchange in the plate type heat exchanger 120, and collected into the coolant storage section 130, and safely injected again into the reactor coolant system 12. Accordingly, when the passive containment building cooling system 100 proposed by the present disclosure is used even though an accident such as a loss of coolant accident or the like occurs at the nuclear power plant 10, it may be possible to suppress an increase of the temperature and pressure of the containment building 11 as well as continuously circulate coolant during the second-half stage (the latter stage) of the accident thereby maintaining a water level of the reactor coolant system 12 for a long period of time.

The process of collecting condensate into the coolant storage section 130 may collect condensate freely falling from the plate type heat exchanger 120, but as illustrated in the drawing, a condensate return line 140 may be installed in the plate type heat exchanger 120. The condensate return line 140 is extended from the plate type heat exchanger 120 to the coolant storage section 130 to allow atmosphere within the containment building 11 to transfer heat from the plate type heat exchanger 120 to the heat exchange fluid and induce condensate formed by condensation to the coolant storage section 130.

The atmosphere that has passed the plate type heat exchanger 120 is condensed to form condensate, and the condensate may be collected into the coolant storage section 130 through the condensate return line 140.

According to the characteristics of the nuclear power plant 10, it may be configured with a hybrid type plate type heat exchanger 220 operated in an air cooling manner during the second-half stage (the latter stage) in which the emergency fluid storage section 110 is exhausted. Furthermore, according to the characteristics of the nuclear power plant 10, it may be configured with an air cooling type plate type heat exchanger 120 operated in an air cooling manner using atmosphere outside the containment building 11 when the emergency fluid storage section 110 is not installed in FIG. 1. In this case, the heat exchange fluid may include atmosphere outside the containment building 11. The lines 123a, 123b may be extended to a space outside the containment building 11 through the containment building 11 to circulate atmosphere outside the containment building.

Hereinafter, a passive containment building cooling system and a nuclear power plant including the same according to another embodiment will be described.

Figure 2:
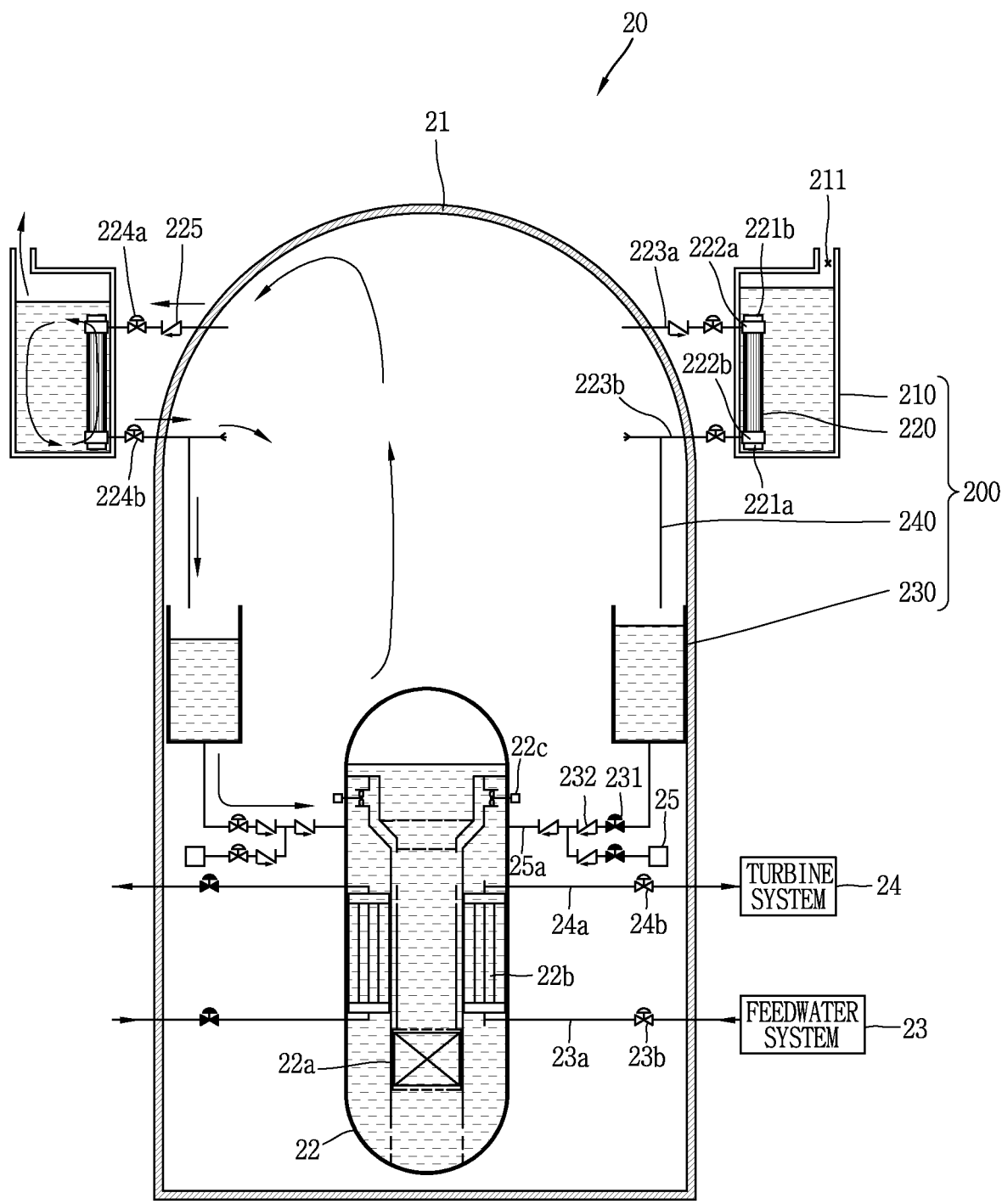
FIG. 2 is a conceptual view illustrating a passive containment building cooling system and a nuclear power plant including the same associated with another embodiment of the present disclosure.

FIG. 2 is a conceptual view illustrating a passive containment building cooling system 200 and a nuclear power plant 20 including the same associated with another embodiment of the present disclosure.

The passive containment building cooling system 200 may include a plate type heat exchanger 220, and may include an emergency fluid storage section 210 and a cooling water storage section 230 according to the characteristics of the nuclear power plant 20.

Contrary to the passive containment building cooling system 100 illustrated in FIG. 1, the plate type heat exchanger 220 of the passive containment building cooling system 200 illustrated in FIG. 2 is installed within the emergency fluid storage section 210. Atmosphere within a containment building 21 uses lines 223a, 223b connected between the containment building 21 and the plate type heat exchanger 220 through the containment building 21 and the emergency fluid storage section 210 as flow paths.

When an accident occurs, atmosphere within the containment building 21 is introduced into the plate type heat exchanger 220 within the emergency fluid storage section 210 through the lines 223a, 223b. In the plate type heat exchanger 220, the atmosphere (specifically, steam contained in the atmosphere) that has transferred heat to heat exchange fluid is condensed to form condensate, and air is cooled and introduced again into the containment building 21 through the lines. Then, the air is discharged into the atmosphere within the containment building 21, and the condensate freely falls down or is collected into a cooling water storage section 230 through a condensate return line 240.

An inlet guide flow path 221a is installed in an inlet region of the fluid flow path to induce heat exchange fluid within the emergency fluid storage section 210 to the plate type heat exchanger 220. An outlet guide flow path 221b is installed in an outlet region of the fluid flow path to induce the discharge of heat exchange fluid from the plate type heat exchanger 220 to the emergency fluid storage section 210.

An inlet header 222a is installed in an inlet region of the atmosphere flow path to distribute atmosphere introduced from the containment building 21 to each channel, and an outlet header 222b is installed in an outlet region of the atmosphere flow path to collect the atmosphere or condensate that has passed through each channel to return to an inside of the containment building 21.

The inlet region of the fluid flow path and the outlet region of the atmosphere flow path may be a lower section of the plate type heat exchanger 220, and the outlet region of the fluid flow path and the inlet region of the atmosphere flow path may be an upper section of the plate type heat exchanger 220.

The condensate return line 240 is branched from the line 223b passing through the containment building 21 and extended to the cooling water storage section 230.

According to the characteristics of the nuclear power plant 20, it may be configured with a hybrid type plate type heat exchanger 220 operated in an air cooling manner during the second-half stage (the latter stage) in which the emergency fluid storage section 210 is exhausted. Furthermore, according to the characteristics of the nuclear power plant 20, it may be configured with an air cooling type plate type heat exchanger 220 operated in an air cooling manner using atmosphere outside the containment building 21 when the emergency fluid storage section 210 is not installed in FIG. 2.

Figure 3:
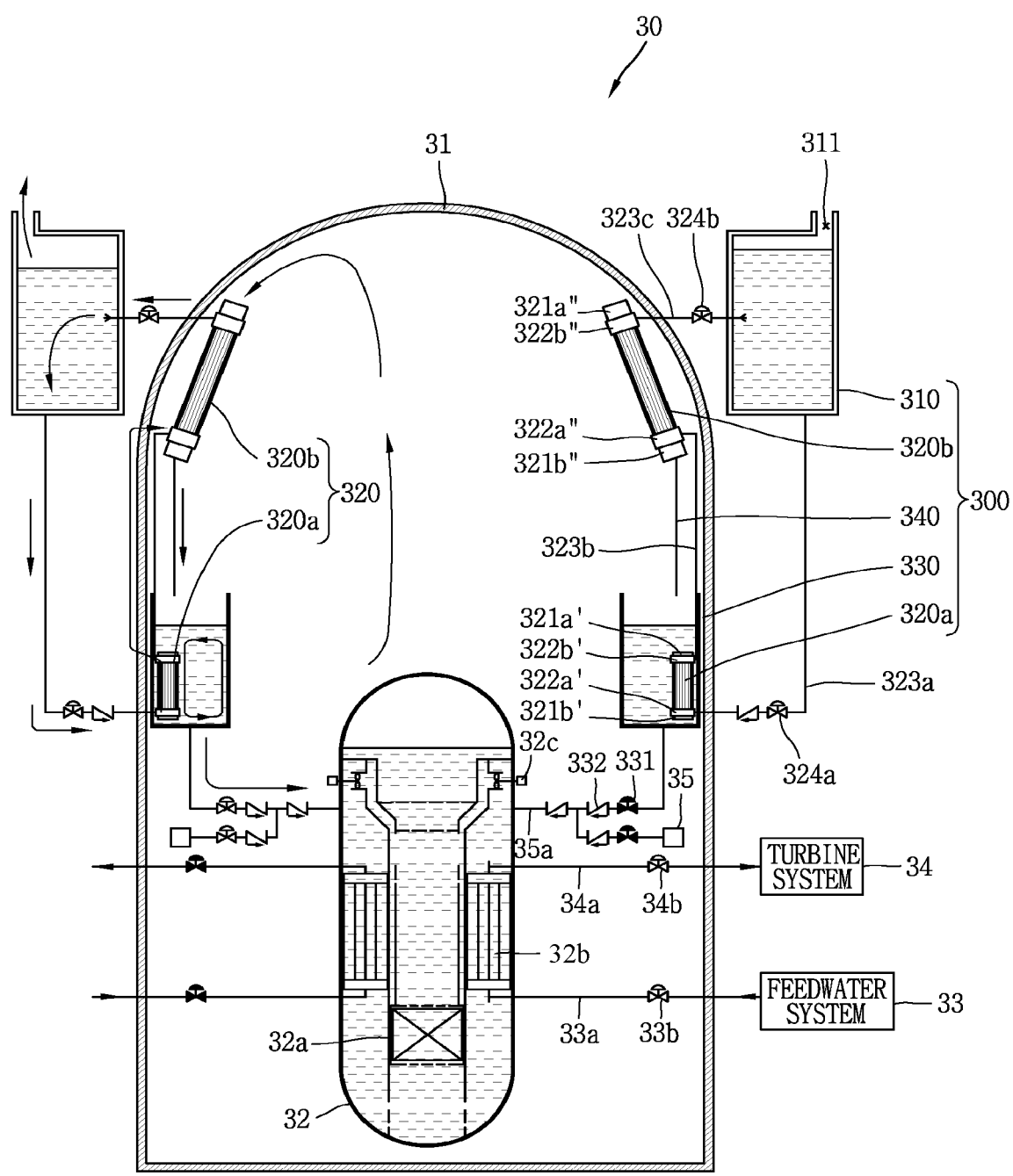
FIG. 3 is a conceptual view illustrating a passive containment building cooling system and a nuclear power plant including the same associated with still another embodiment of the present disclosure.

FIG. 3 is a conceptual view illustrating a passive containment building cooling system 300 and a nuclear power plant 30 including the same associated with still another embodiment of the present disclosure.

For the passive containment building cooling system 300 illustrated in FIG. 3, another plate type heat exchanger 320a is added to the passive containment building cooling system 100 illustrated in FIG. 1, and the configuration of lines 323a, 323b, 323c for circulating atmosphere and heat exchange fluid is different therefrom.

A plate type heat exchanger 320 may include a first plate type heat exchanger 320a installed within a cooling water storage section 330 and a second plate type heat exchanger 320b installed in an atmospheric region within a containment building 31.

The first plate type heat exchanger 320a is formed in such a manner that at least part thereof is immersed in cooling water accommodated in the cooling water storage section 330, and an inlet thereof is connected to the emergency fluid storage section 310 by the line 323a to receive heat exchange fluid from the emergency fluid storage section 310.

The second plate type heat exchanger 320b is formed in such a manner that an inlet thereof is connected to an outlet of the first plate type heat exchanger 320a by the line 323b to form a closed loop for circulating the heat exchange fluid of the emergency fluid storage section 310, and an outlet thereof is connected to the emergency fluid storage section 310 by the line 323c.

The heat exchange fluid of the emergency fluid storage section 310 is introduced into the first plate type heat exchanger 320a from the emergency fluid storage section 310 to primarily exchange heat with condensate stored in the cooling water storage section 330. At least part of an upper section of the cooling water storage section 330 is open, and therefore, the condensate stored in the cooling water storage section 330 is in a high-temperature state due to receiving heat from the atmosphere of the containment building 31 or introducing coolant at high temperature discharged from a reactor coolant system 32 when the temperature of the containment building 31 increases. Accordingly, the condensate stored in the cooling water storage section 330 is introduced to an upper section of the first plate type heat exchanger 320a and discharged to a lower section thereof to transfer heat to the heat exchange fluid supplied from the emergency fluid storage section 310.

The heat exchange fluid that has received heat from the first plate type heat exchanger 320a is introduced to the second plate type heat exchanger 320b through the line 323b connected between the first plate type heat exchanger 320a and the second plate type heat exchanger 320b. The heat exchange fluid exchanges heat with the atmosphere of the containment building 31 passing through another channel from the second plate type heat exchanger 320b to receive heat, and is discharged to an upper section of the second plate type heat exchanger 320b and returned to the emergency fluid storage section 310 through the line 323c to continue circulation.

According to the characteristics of the nuclear power plant 30, it may be configured with a hybrid type plate type heat exchanger 320 operated in an air cooling manner during the second-half stage (the latter stage) in which the emergency fluid storage section 310 is exhausted. Furthermore, according to the characteristics of the nuclear power plant 30, it may be configured with an air cooling type plate type heat exchanger 320 operated in an air cooling manner using atmosphere outside the containment building 31 when the emergency fluid storage section 310 is not installed in FIG. 3.

Figure 4:
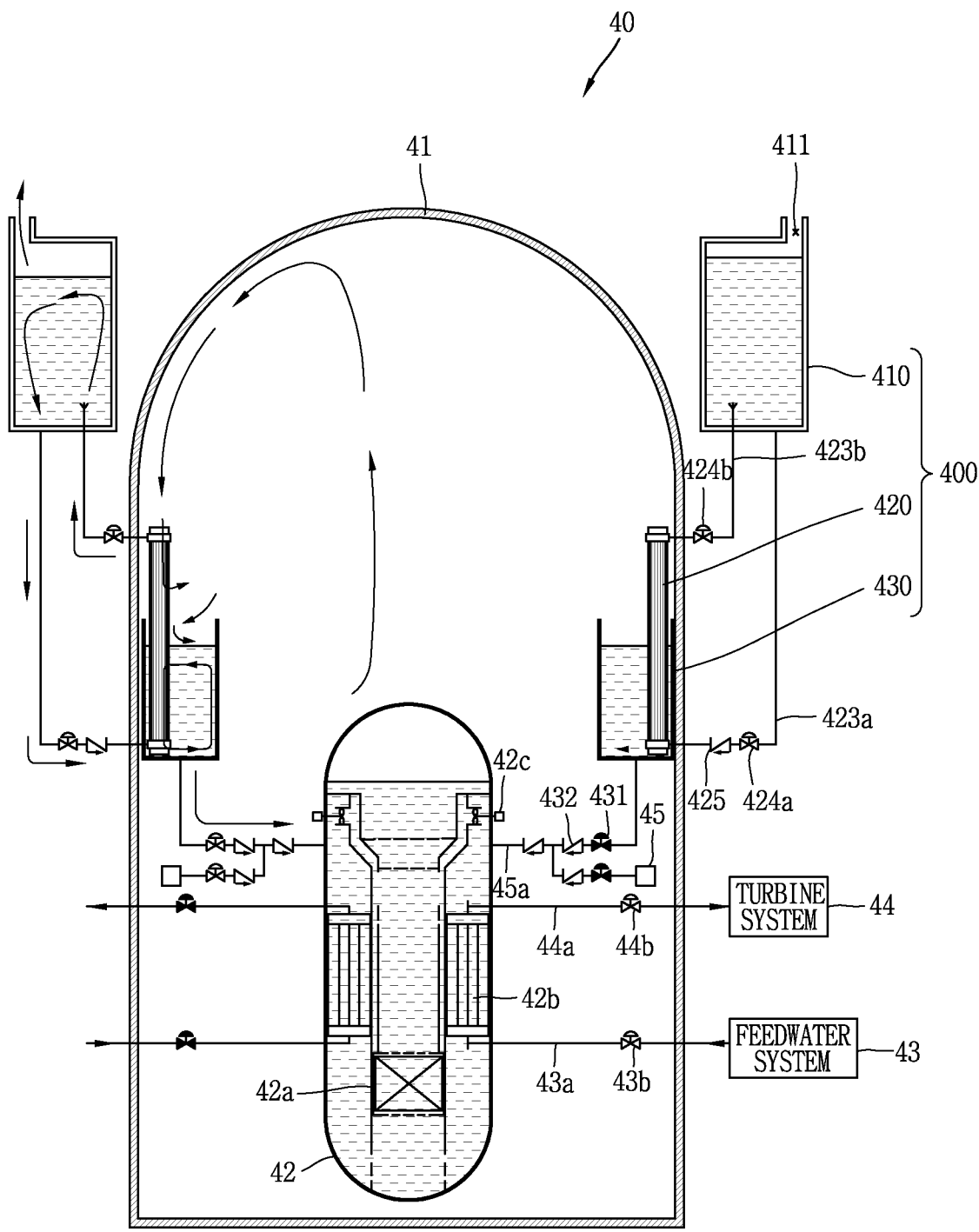
FIG. 4 is a conceptual view illustrating a passive containment building cooling system and a nuclear power plant including the same associated with yet still another embodiment of the present disclosure.

FIG. 4 is a conceptual view illustrating a passive containment building cooling system 400 and a nuclear power plant 40 including the same associated with yet still another embodiment of the present disclosure.

A plate type heat exchanger 420 is formed with a longer length than the height of the cooling water storage section 430 to be partially immersed in the cooling water storage section 430. As illustrated in the drawing, a part of the plate type heat exchanger 420 is immersed in cooling water, and another part thereof is exposed to the atmosphere of a containment building 41.

The channels of the plate type heat exchanger 420 may include a cooling water flow path, a fluid flow path and an atmosphere flow path. The cooling water flow path is arranged at one side of a plate (a boundary surface) to allow the cooling water of the cooling water storage section 430 to pass therethrough, and the fluid flow path is arranged at the other side of the plate to allow the heat exchange fluid of the emergency fluid storage section 410. The atmosphere flow path is started from an outlet region of the cooling water flow path subsequent to the cooling water flow path to allow atmosphere continuously transferring heat to the heat exchange fluid passing through the fluid flow path to pass therethrough.

The heat exchange fluid introduced into the plate type heat exchanger 420 from the emergency fluid storage section 410 is primarily heated by the cooling water of the cooling water storage section 430 and secondarily heated by the atmosphere of the containment building 41.

In the above, the operation of the passive containment building cooling system due to natural circulation has been described, but in actuality when the plate type heat exchanger is applied to the passive containment building cooling system, problems such as flow instability in a two phase flow region, bottleneck phenomenon at a heat exchanger inlet, and the like may occur, and thus it is required to enhance them. Hereinafter, a structure of the plate type heat exchanger proposed by the present disclosure to enhance the problems will be described.

The following description will be described without distinguishing a atmosphere flow path from a fluid flow path, and unless the description thereof is only limited to either one of the atmosphere flow path and the fluid flow path, the description of the atmosphere flow path will be also applicable to that of the fluid flow path, and the description of the fluid flow path will be also applicable to that of the atmosphere flow path.

FIGS. 5 through 17 are flow path conceptual views illustrating a plate type heat exchanger 520 selectively applicable to the passive containment building cooling system 100, 200, 300, 400 in FIGS. 1 through 4.

Figure 5:
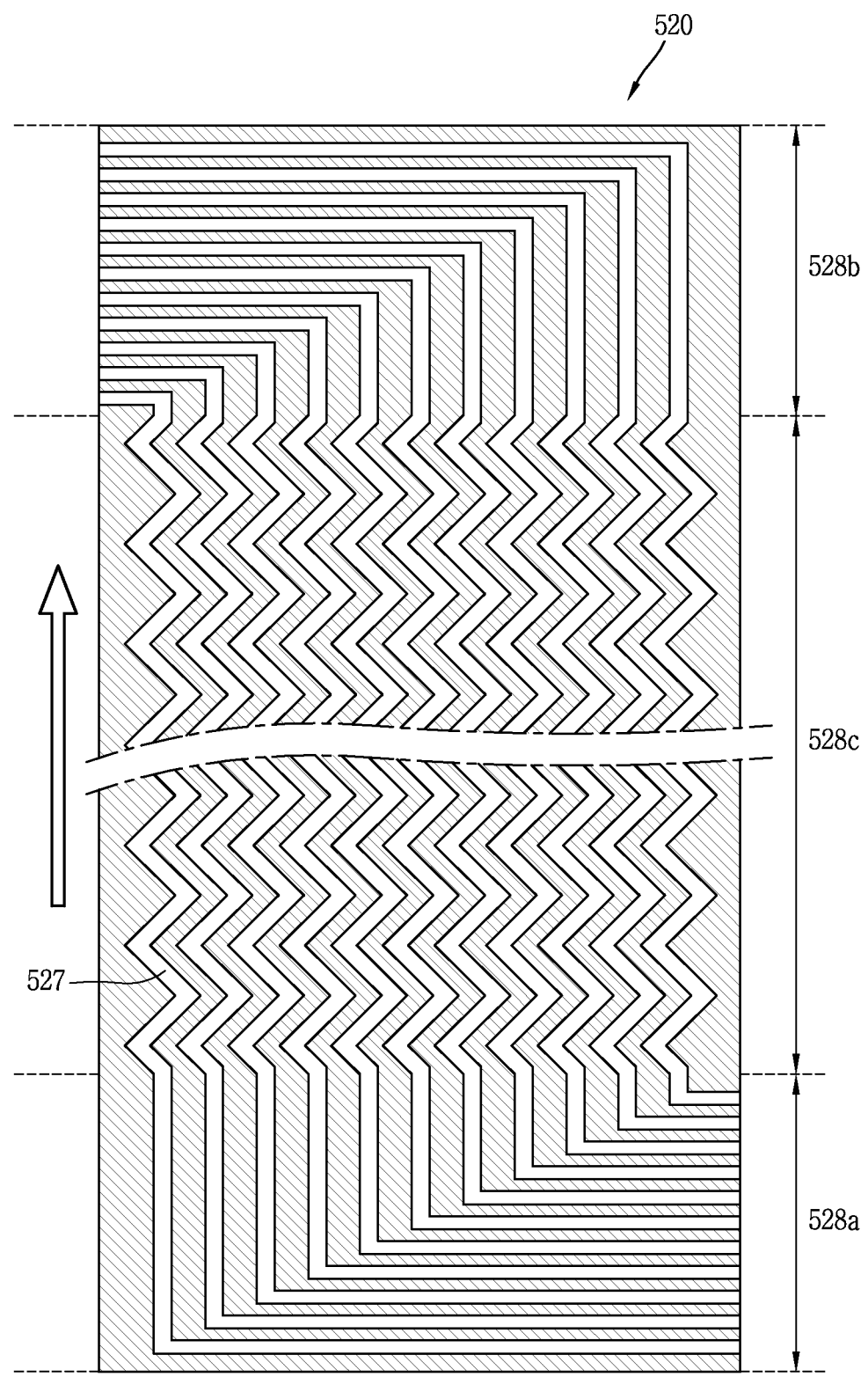
FIGS. 5 through 16 are flow path conceptual views illustrating a plate type heat exchanger selectively applicable to the passive containment building cooling system in FIGS. 1 through 4.
Figure 6:
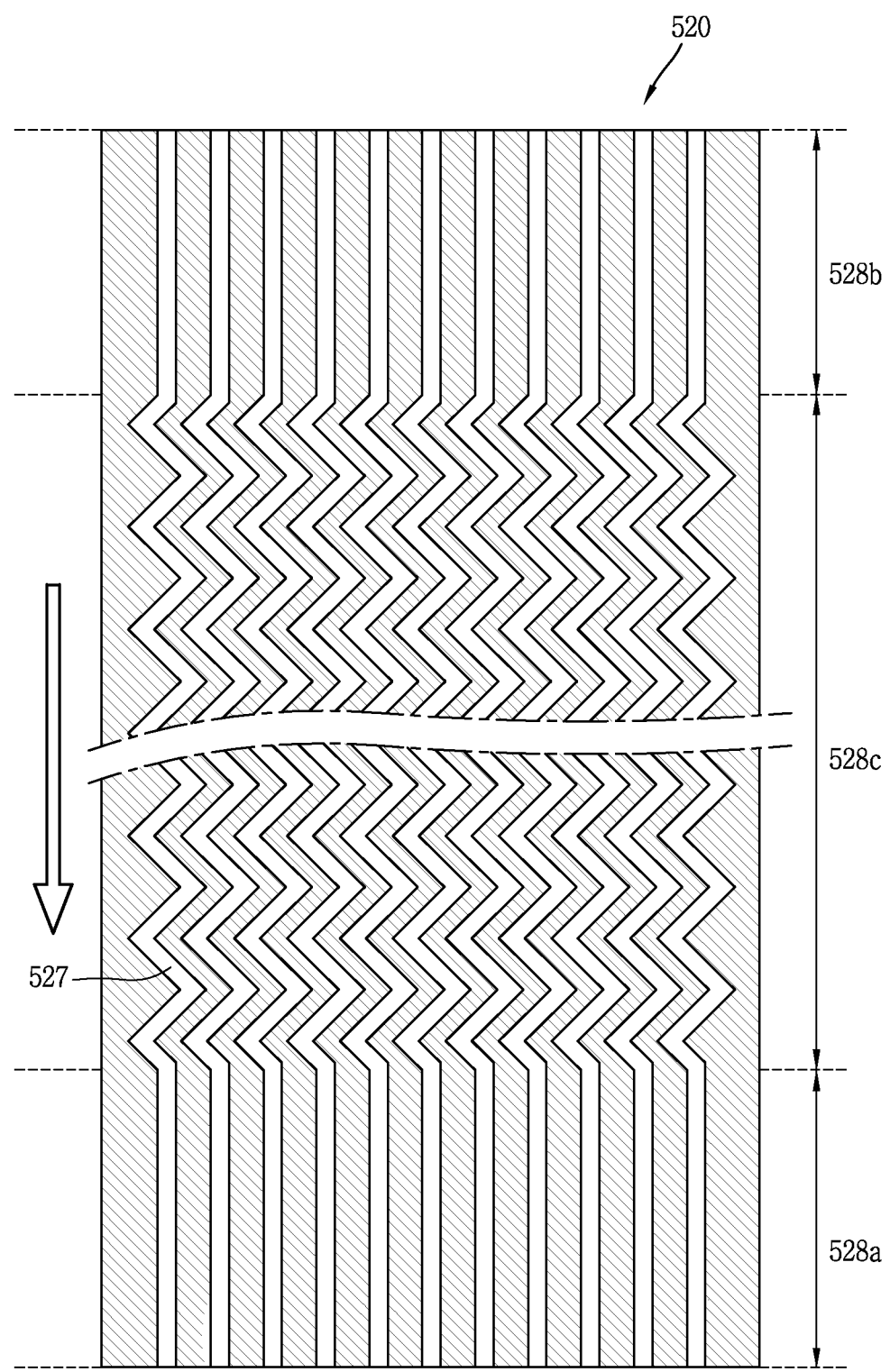

First, it is illustrated that channels 527 in FIGS. 5 and 6 correspond to fluid flow paths and atmosphere flow paths, respectively, and the fluid flow path and atmosphere flow paths are both formed with closed flow paths.

When a fabrication technique of a printed circuit type heat exchanger is applied to the plate type heat exchanger 520, it has a structure capable of allowing a dense flow path arrangement by a photochemical etching technology and removing a welding between the plates of the heat exchanger using a diffusion bonding technology, and allows a typical plate type heat exchanger to have a dense flow path arrangement. The plate type heat exchanger 520 may include channels 527 distinguished from each other at both sides of a plate since heat exchange should be induced while exchanging heat between the atmosphere of the containment building and the heat exchange fluid of the emergency fluid storage section and maintaining a pressure boundary between an inside (atmosphere) and an outside (heat exchange fluid) of the containment building. Here, the atmosphere of the containment building may denote atmosphere within the containment building.

The channels 527 may include an atmosphere flow path allowing atmosphere to pass therethrough and a fluid flow path allowing a heat exchange fluid to pass therethrough, and each channel 527 corresponds to either one of the atmosphere flow path and the fluid flow path. The atmosphere flow path is arranged at one side of a plate to allow atmosphere within the containment building to pass therethrough, and the fluid flow path is arranged at the other side of the plate to allow the heat exchange fluid of the emergency fluid storage section pass therethrough while maintaining a pressure boundary to the atmosphere flow path.

The shape of the atmosphere flow path and fluid flow path may be a closed flow path in the shape of allowing atmosphere to pass therethrough only in one direction and allowing heat exchange fluid to pass therethrough only in a direction opposite to the one direction. Furthermore, the shape of the atmosphere flow path and fluid flow path may be also an open flow path in the shape of allowing atmosphere or heat exchange fluid to pass therethrough even in a direction crossing the one direction.

The shape of the atmosphere flow path and fluid flow path may vary according to the installation location of the plate type heat exchanger 520. The plate type heat exchanger 520 may be installed at least one place of an inside and an outside of the containment building. In particular, the closed flow path may be applicable regardless of the installation location of the plate type heat exchanger 520, but the open flow path may be applicable in a restrictive manner to prevent the damage of a pressure boundary.

When the plate type heat exchanger 520 is installed at an inside of the containment building, an open flow path may be applicable to the atmosphere flow path, but the open flow path may not be applicable to the fluid flow path due to the damage of a pressure boundary. On the contrary, when the plate type heat exchanger 520 is installed at an outside of the containment building such as the emergency fluid storage section, an open flow path may be applicable to the fluid flow path, but the open flow path may not be applicable to the atmosphere flow path due to the damage of a pressure boundary.

Referring to FIGS. 5 and 6, all the flow paths of the plate type heat exchanger 520 illustrated in the drawings correspond to closed flow paths, wherein a conceptual view of FIG. 5 illustrates a fluid flow path, and a conceptual view of FIG. 6 illustrates an atmosphere flow path. The fluid flow path and atmosphere flow path are arranged at both sides of a plate on the basis thereof. Accordingly, a fluid flow path illustrated in FIG. 5 corresponds to an opposite surface of an atmosphere flow path illustrated in FIG. 6.

The plate type heat exchanger 520 may include an inlet region 528a, an outlet region 528b and a main heat transfer region 528c. The inlet region 528a is a region for distributing atmosphere or heat exchange fluid supplied to the plate type heat exchanger 520 to channels 527, respectively, and the main heat transfer region 528c is a region for carrying out substantial heat exchange between atmosphere and heat exchange fluid, and the outlet region 528b is a region for collecting and discharging atmosphere or heat exchange fluid that has completed heat exchange from the channels 527, respectively. The main heat transfer region 528c is connected between the inlet region 528a and the outlet region 528b, and formed between the inlet region 528a and the outlet region 528b.

Referring to FIG. 5, since a temperature of the heat exchange fluid is lower than that of the atmosphere, the temperature thereof increases due to heat transferred from the atmosphere while the heat exchange fluid passes through the plate type heat exchanger 520. On the contrary, referring to FIG. 6, since a temperature of the heat exchange fluid is higher than that of the atmosphere, the temperature thereof decreases due to cooling during which heat is transferred to the heat exchange fluid while the atmosphere passes through the plate type heat exchanger 520.

Figure 7:
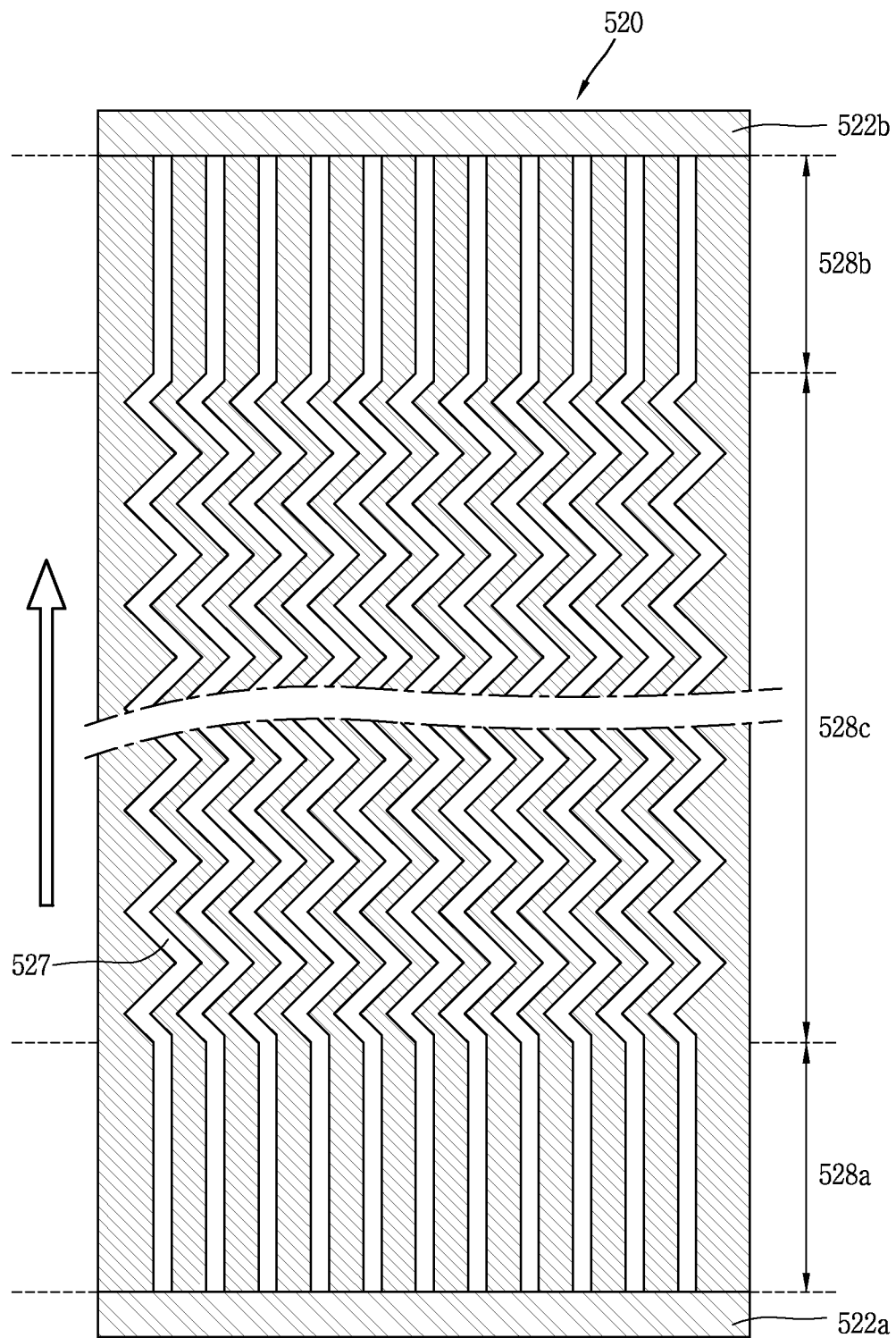

FIG. 7 is a conceptual view illustrating a fluid flow path of the plate type heat exchanger 520 including headers 522, 522b at an inlet and an outlet thereof.

The plate type heat exchanger 520 may further include an inlet header 522a and an outlet header 522b, and the channel 527 corresponds to a fluid flow path.

The inlet header 522a is installed in an inlet region of a fluid flow path and connected to each fluid flow path to distribute heat exchange fluid supplied from the emergency fluid storage section. The outlet header 522b is installed in an outlet region of a fluid flow path and connected to each fluid flow path to collect heat exchange fluid that has passed through the fluid flow path and return to the emergency fluid storage section.

When the plate type heat exchanger 520 is installed within the containment building, the heat exchange fluid of the emergency fluid storage section is supplied to the fluid flow path and supplied to the channels 527, respectively, through the inlet header inlet header 522a. Furthermore, the heat exchange fluid, the temperature of which is increased due to heat transferred from the main heat transfer region 528c, is collected again through the outlet header 522b and moved to the emergency fluid storage section.

Figure 8:
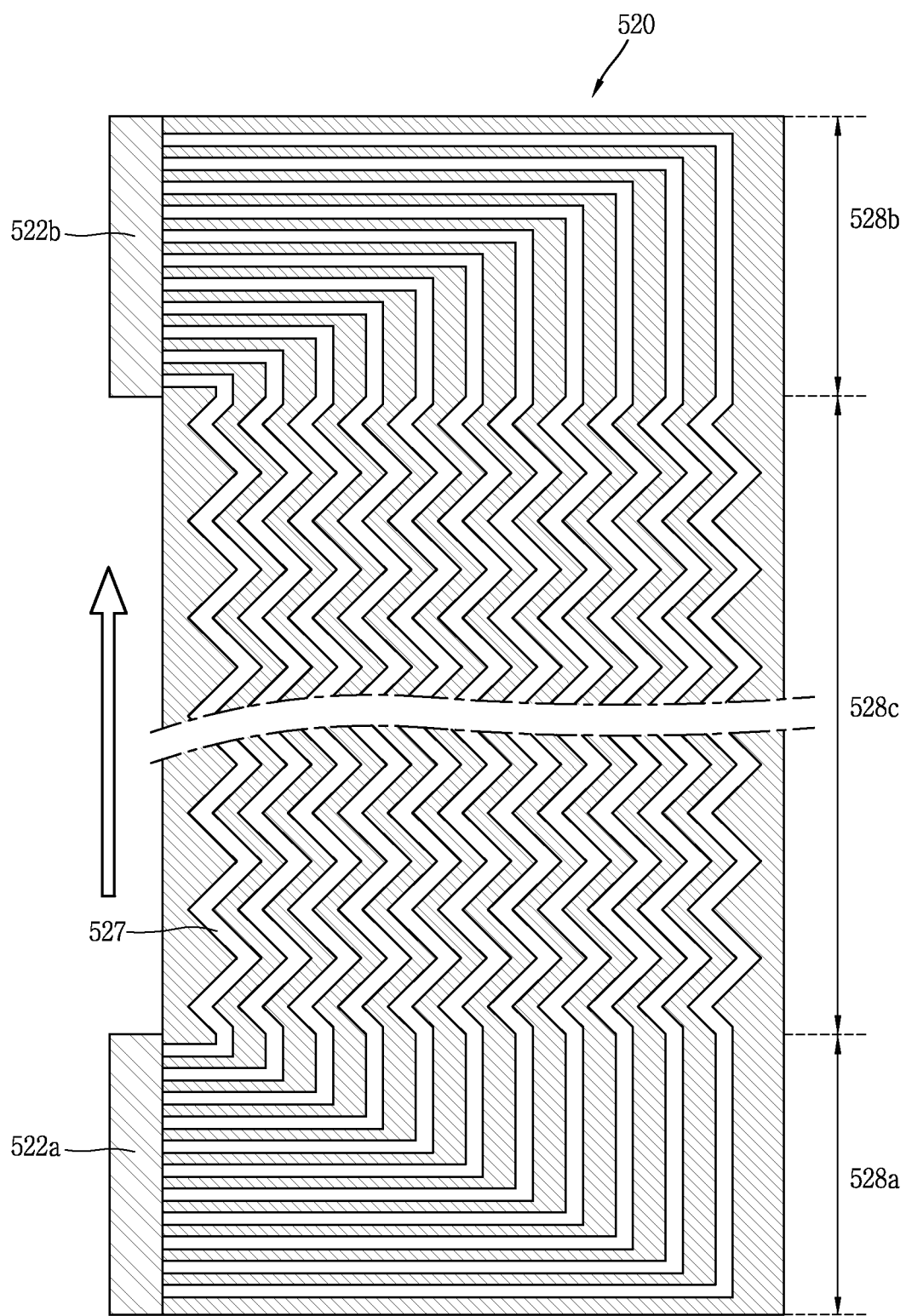
Figure 9:
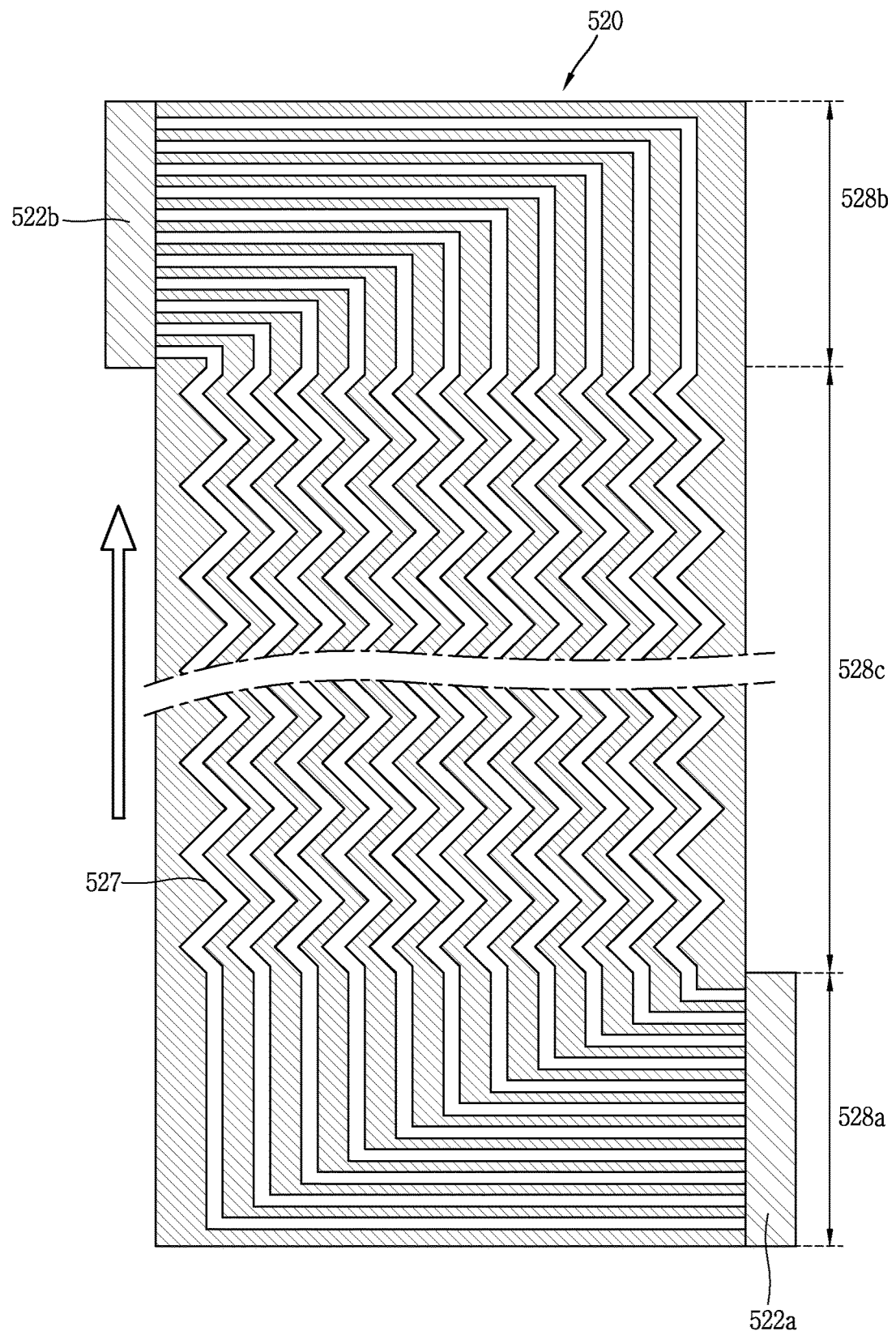

FIGS. 8 and 9 are modified examples illustrating a fluid flow path of the plate type heat exchanger 520 having headers at an inlet and an outlet thereof.

The installation location of the inlet header 522a and outlet header 522b may vary according to the design of the plate type heat exchanger 520. In particular, when a fabrication technique of a printed circuit type heat exchanger is applied to the plate type heat exchanger 520, it may be fabricated by a photochemical etching technology to freely select the structure of channels 527, and a typical plate type heat exchanger may adopt a flow path pattern without restraint, and thus the location of the inlet header 522a and outlet header 522b may also vary.

FIGS. 8 and 9 illustrate an example in which in particular, the inlet header 522a and outlet header 522b are installed at a lateral surface of the plate type heat exchanger 520, respectively, and each channels 527 is bent in at least one region thereof or formed to have a curved flow path and extended to the inlet header 522a or outlet header 522b.

An extension direction of the channel 527 in the inlet region 528a and an extension direction of the channel 527 in the outlet region 528b may be the same direction as illustrated in FIG. 8, or may be opposite directions to each other, and vary according to the design of the passive containment building cooling system.

Figure 10:
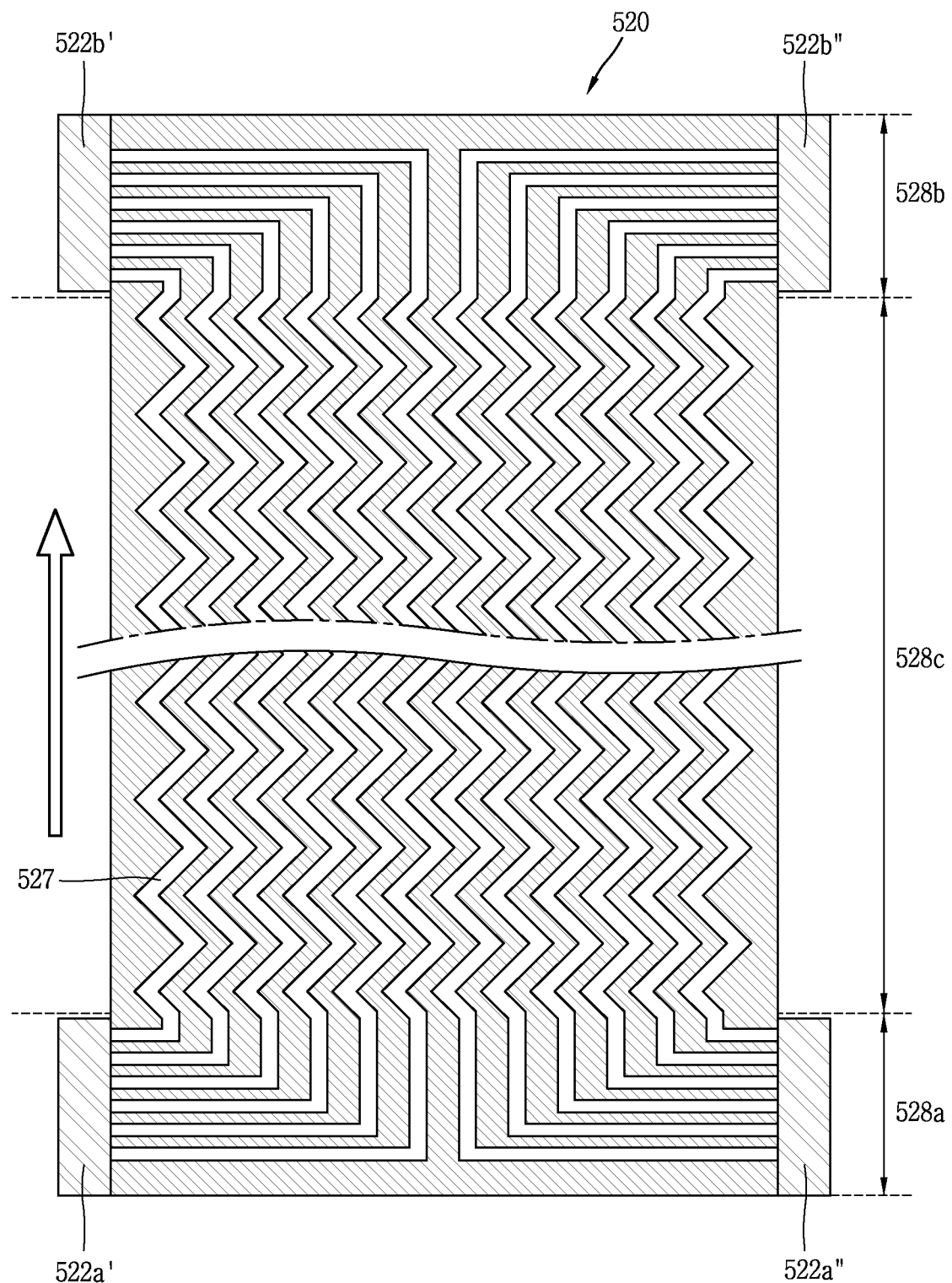

Referring to FIG. 10, it may be provided with a plurality of inlet headers 522a', 522a" and outlet headers 522b', 522h" to induce an efficient flow of the fluid flow path. The plurality of inlet headers 522a', 522a" may be connected to different fluid flow paths to supply heat exchange fluid to the different fluid flow paths, respectively, and the plurality of outlet headers 522b', 522b" may be connected to different fluid flow paths to collect heat exchange fluid from the different fluid flow paths, respectively.

When there are provided with a plurality of inlet headers 522a', 522a" and outlet headers 522b', 522b", a size thereof may be reduced compared to a single header, thereby efficiently supplying heat exchange fluid to the fluid flow paths. Accordingly, as a whole, it may be possible to induce efficient flow to the fluid flow paths.

Figure 11:
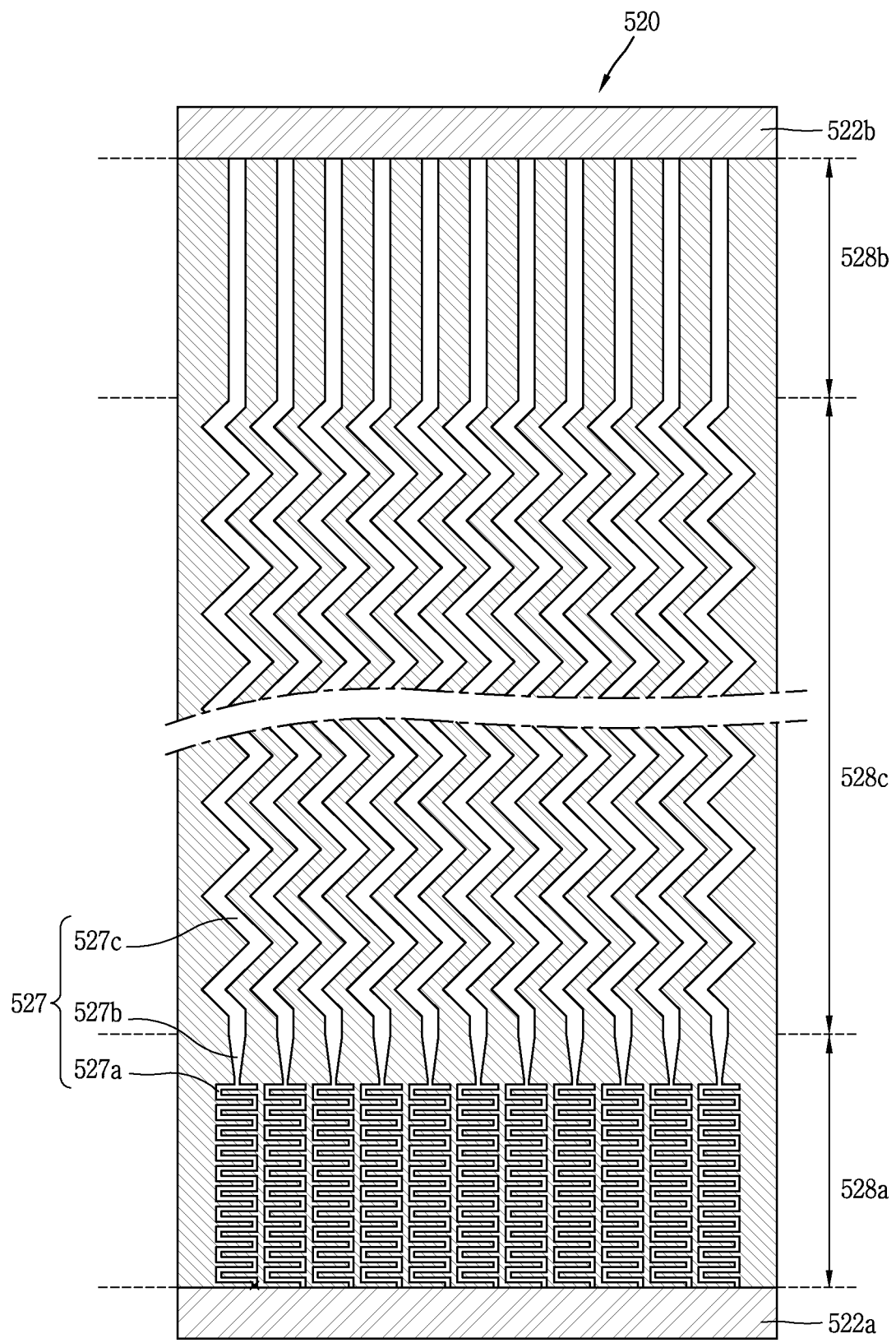

Referring to FIG. 11, the channels may be formed in such a manner that a flow resistance of the inlet region 528a is relatively larger than that of the main heat transfer region 528c connected between the inlet region 528a and the outlet region 528b to mitigate flow instability due to two phase flow.

There may be various methods of forming a relatively large flow resistance, but the plate type heat exchanger 520 illustrated in FIG. 11 employs a structure in which a flow path in the inlet region 528a is formed with a smaller width than that of the main heat transfer region 528c and has a flow path 527a longer than a straight flow path.

The flow path 527a of the inlet region 528a is formed in a zigzag shape to have a relatively larger flow resistance than that of straight flow path and connected to the main heat transfer region 528c. Specifically, it is formed in a shape in which the flow path 727a of the inlet region 528a is alternatively and repetitively connected in a length direction and a width direction of the plate type heat exchanger 520, and extended to the main heat transfer region 528c. As a flow resistance of the inlet region 528a is formed to be larger than that of the main heat transfer region 528c, it may be possible to reduce a flow instability occurrence probability in two phase flow.

A flow expansion section 527b is formed between the inlet region 528a and the main heat transfer region 528c, and formed in such a manner that a width of the flow path gradually increases toward an extension direction from a flow path size of the inlet region 528a to a flow path size of the main heat transfer region 528c. The flow resistance relatively decreases while passing the flow expansion section 527b, and the relatively small flow resistance is maintained on the flow path 527c of the subsequent main heat transfer region 528c and outlet region 528b.

Figure 12:
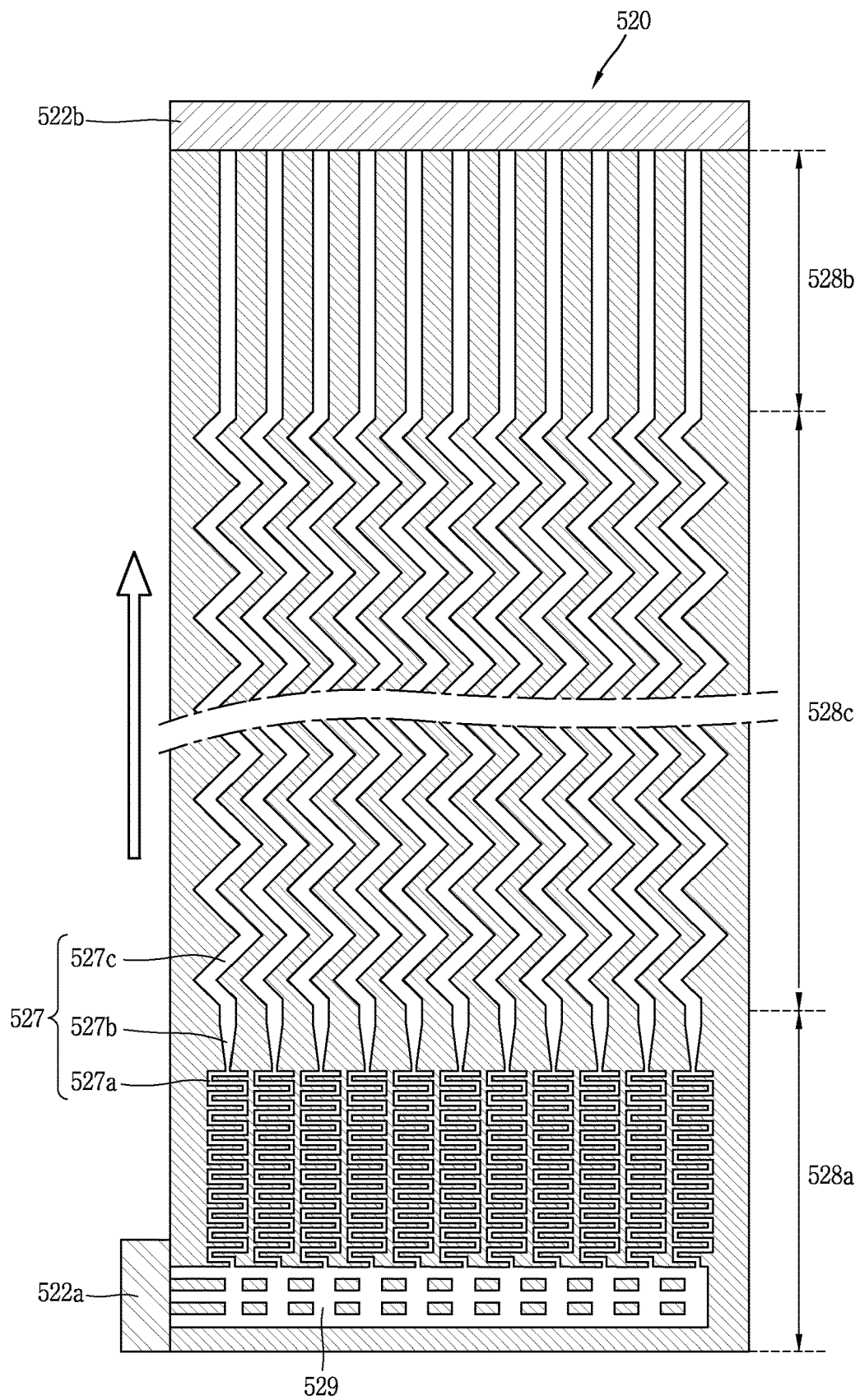

Referring to FIG. 12, a common header 529 connected between the inlet header 522a disposed at a lateral surface of the plate type heat exchanger 520 and each channel 527 of the inlet region 528a may be installed at the plate type heat exchanger 520.

The common header 529 is extended from one side section of the plate type heat exchanger and connected between the inlet header 522a and flow path 527 to uniformly distribute heat exchange fluid supplied from the emergency fluid storage section to the flow paths 527. The common header 529 may uniformly distribute heat exchange fluid to the fluid flow paths to prevent an flow rate from being concentrated on any one fluid flow path, and overcome a problem of inlet flow instability.

Figure 13:
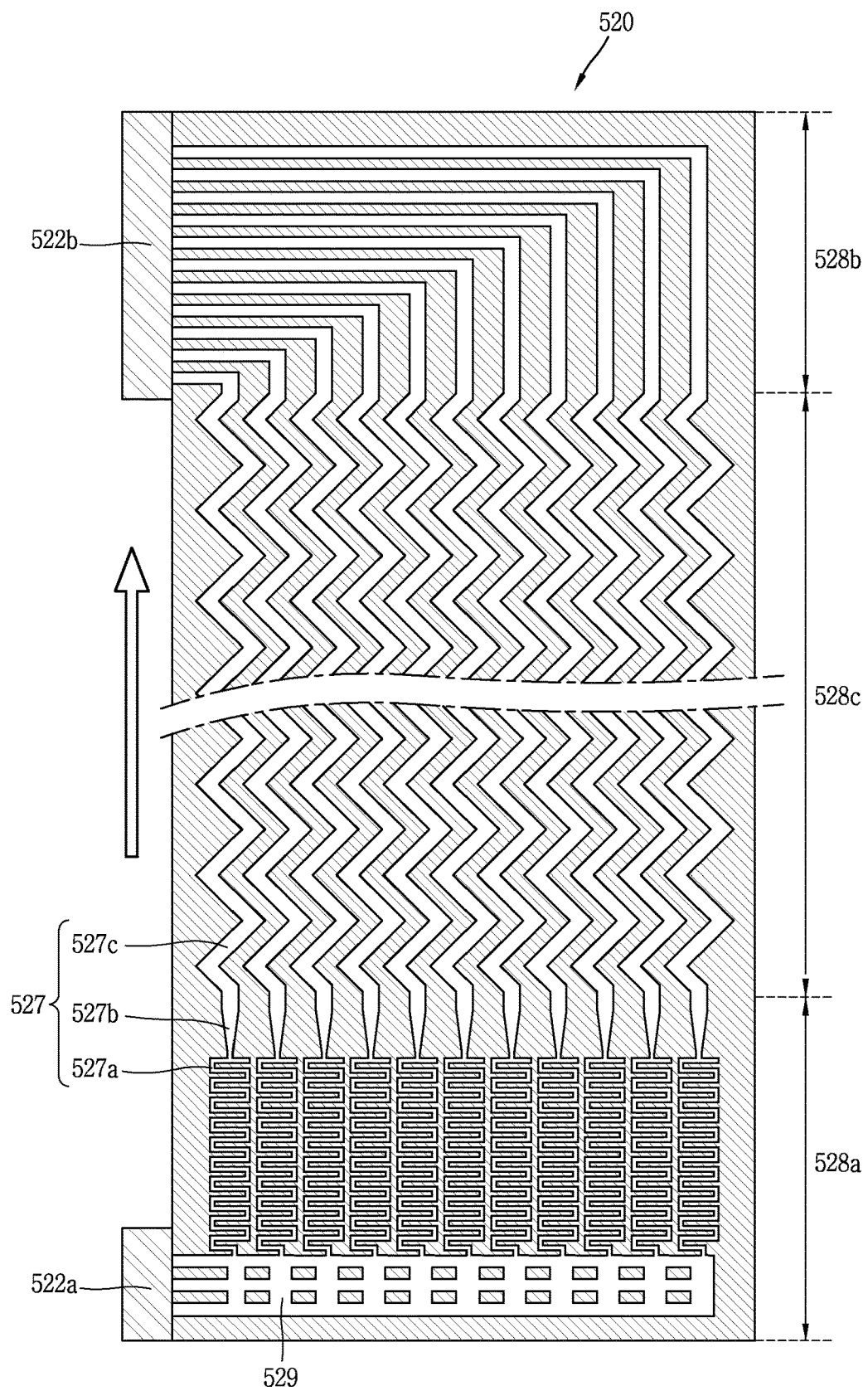

Referring to FIG. 13, it is illustrated a modified example capable of changing a direction of forming the fluid flow path and a location of the outlet header 522b to a lateral surface section of the plate type heat exchanger 520.

Figure 14:
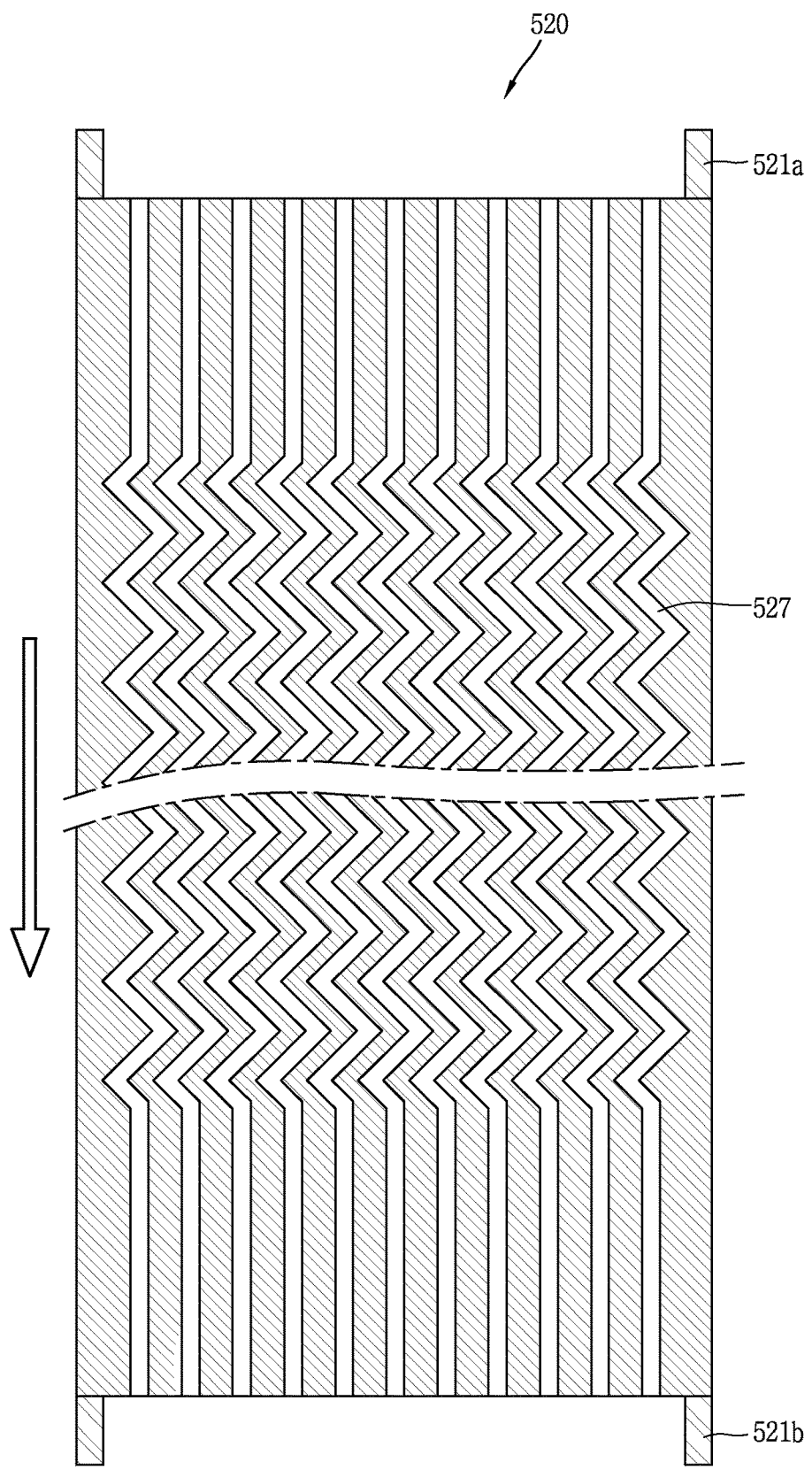

Referring to FIG. 14, it is illustrated a modified example in which an inlet guide flow path 521a and an outlet guide flow path 521b are installed at an inlet and an outlet of the plate type heat exchanger 520, respectively.

The inlet guide flow path 521a is installed at an inlet of the plate type heat exchanger 520 and protruded in an entrainment direction of atmosphere to induce the atmosphere within the containment building to the plate type heat exchanger 520. Furthermore, the outlet guide flow path 521b is installed at an outlet of the plate type heat exchanger 520 and protruded in a discharge direction of atmosphere to guide the atmosphere discharged from the plate type heat exchanger 520 to an inside of the containment building.

Figure 15:
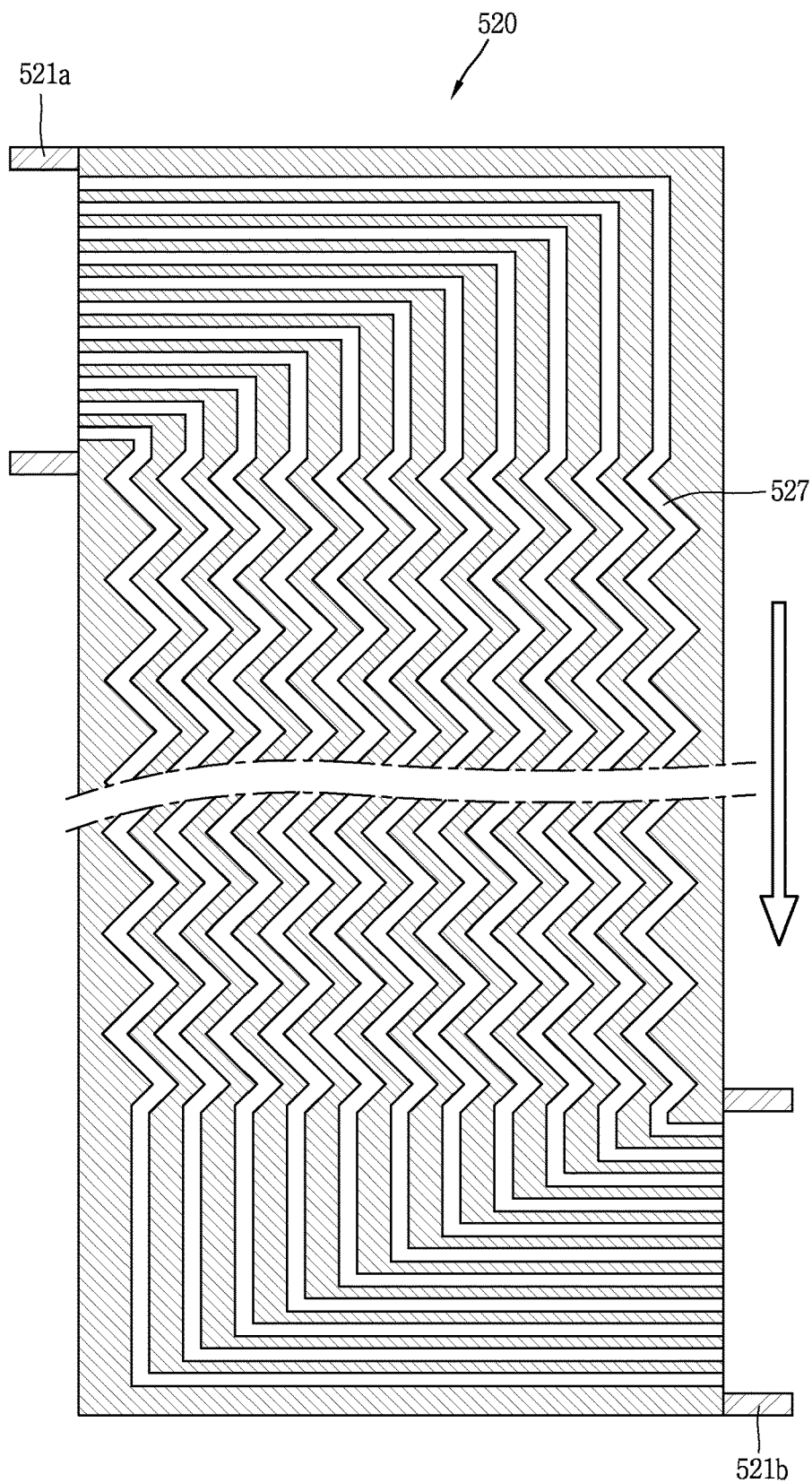

Referring to FIG. 15, it is illustrated a modified example capable of changing a direction of forming the atmosphere flow path, and a location of the inlet guide flow path 521a and outlet guide flow path 521b to a lateral surface section of the plate type heat exchanger 520. The atmosphere flow path is bent in at least once in the inlet region and outlet region, respectively, or formed to have a curved flow path and extended to a lateral surface section of the plate type heat exchanger 520.

Figure 16:
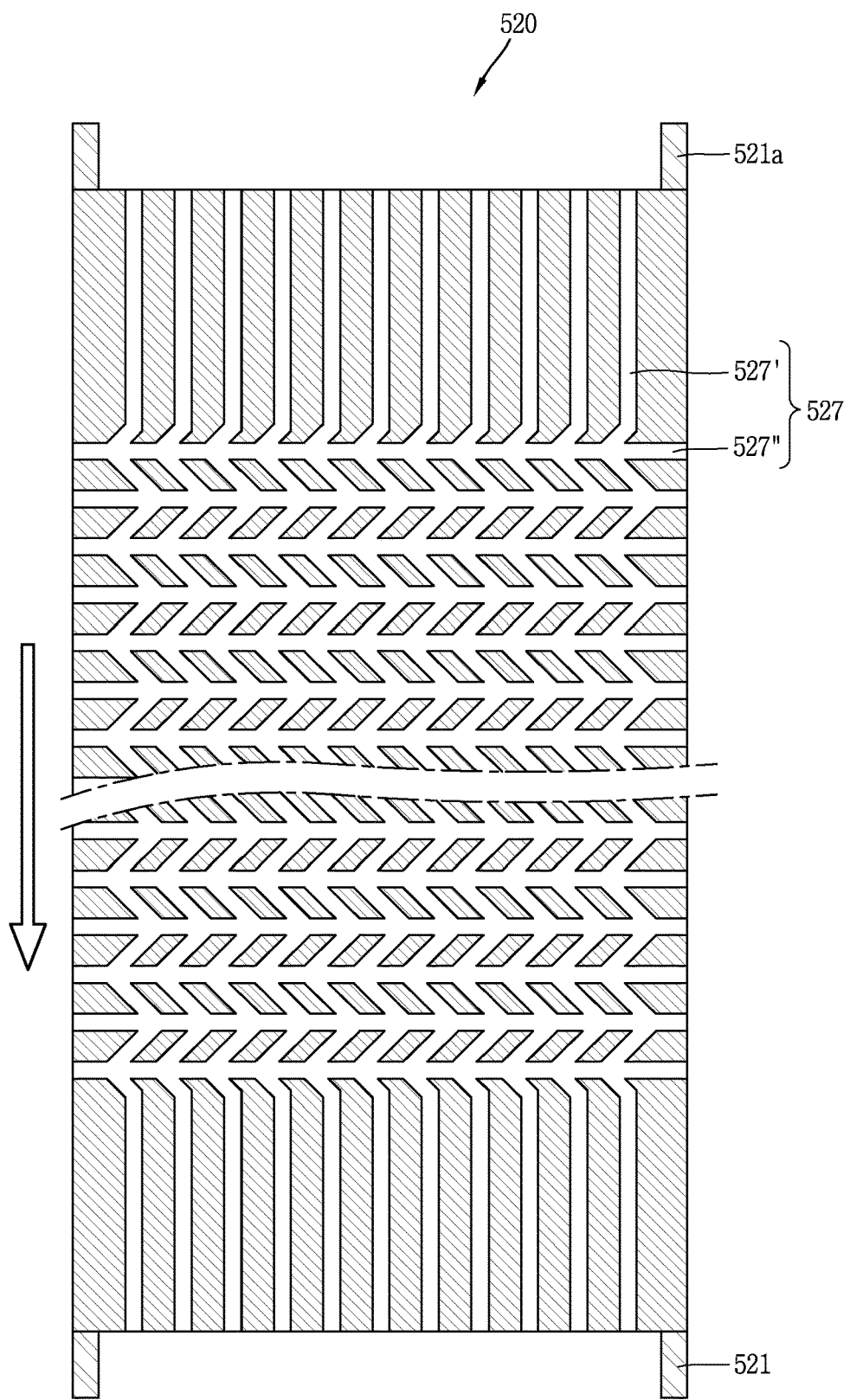

FIG. 16 is a flow path conceptual view illustrating the plate type heat exchanger 520 having an open flow path.

The plate type heat exchanger 520 may include an open type flow path formed to introduce the atmosphere or the heat exchange fluid from a lateral surface to join atmosphere or heat exchange fluid passing through the channels so as to mitigate a bottleneck phenomenon at the inlet while maintaining a pressure boundary between the containment building and the emergency fluid storage section.

The plate type heat exchanger 520 may include a first atmosphere flow path 527' and a second atmosphere flow path 527" for forming an open flow path. The first atmosphere flow path 527' is connected between an inlet of an upper end section of the plate type heat exchanger 520 and an outlet of a lower end section thereof. The second atmosphere flow path 527" is formed to flow the atmosphere in or out through an inlet and an outlet formed at both side sections of the plate type heat exchanger 520 and configured to form a count flow with the first atmosphere flow path 527' so as to mitigate a bottleneck phenomenon of the inlet.

Hereinafter, a structure of coupling a plurality of plate type heat exchangers as a scheme of mitigating a bottleneck phenomenon at an inlet of the plate type heat exchanger will be described.

Figure 17:
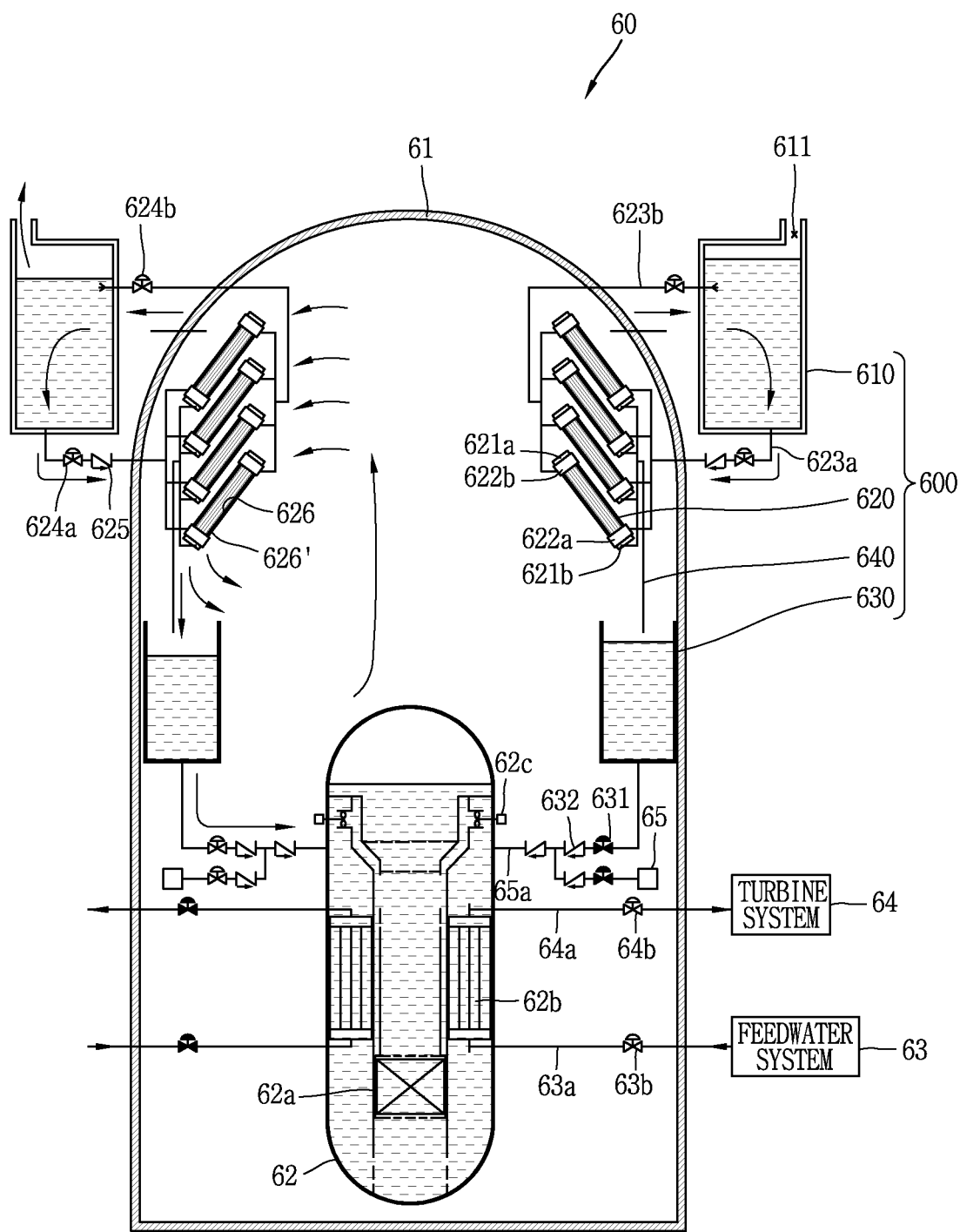
FIG. 17 is a conceptual view illustrating a passive containment building cooling system and a nuclear power plant including the same associated with still yet another embodiment of the present disclosure.

FIG. 17 is a conceptual view illustrating a passive containment building cooling system 600 and a nuclear power plant 60 including the same associated with still yet another embodiment of the present disclosure.

A plurality of plate type heat exchangers 620 may be provided to mitigate a bottleneck phenomenon of the inlet. The plurality of plate type heat exchangers 620 may be arranged in parallel to an inside or outside of the containment building 61. A bottleneck phenomenon that can occur due to a small inlet of the plate type heat exchanger 620 may be mitigated by increasing a number of plate type heat exchangers 620 and using an intermediate flow path between the plate type heat exchangers 620 as an atmosphere flow path at the same time.

A casing 626 is formed to surround at least part of the plate type heat exchanger 620, and a cooling fin 626' is formed to surround at least part of the casing 626 to expand a heat transfer area thereof. The cooling fin 626' may enhance a cooling efficiency of the atmosphere.

An inlet connection line 623a' is connected to the inlet headers 622a to distribute heat exchange fluid supplied from an emergency fluid storage section 610 to an inlet header 622a provided in each plate type heat exchanger 620. An outlet connection line 623b' is connected to an outlet header 622b for each outlet of the plate type heat exchanger 620 to collect the heat exchange fluid that has passed through each plate type heat exchanger 620 and return to the emergency fluid storage section 610.

Other configurations other than mitigating a bottleneck phenomenon of the inlet due to a plurality of plate type heat exchangers 620 provided therein have been described in FIG. 1.

Figure 18:
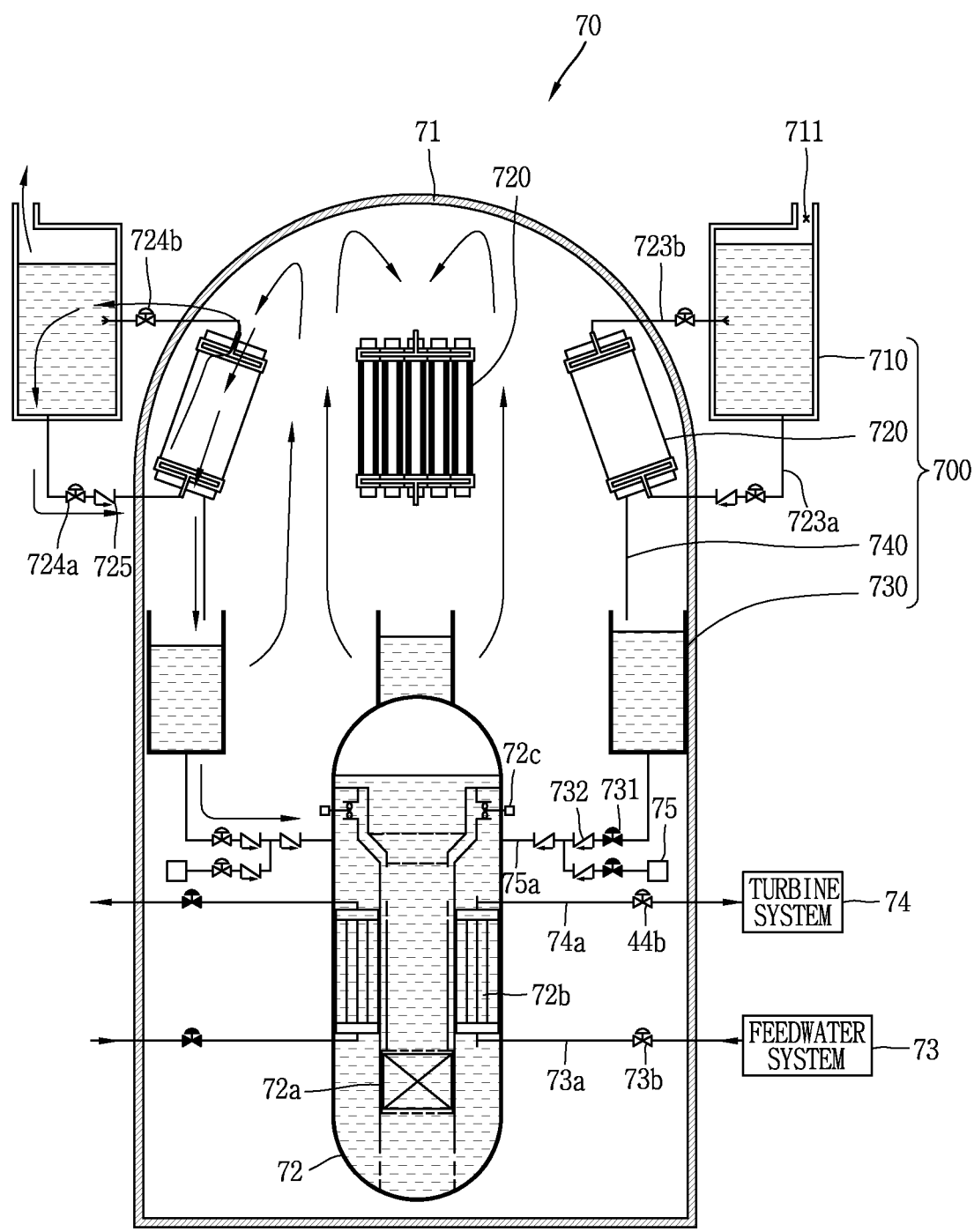
FIG. 18 is a conceptual view illustrating a passive containment building cooling system and a nuclear power plant including the same associated with yet still another embodiment of the present disclosure.

FIG. 18 is a conceptual view illustrating a passive containment building cooling system 700 and a nuclear power plant 70 including the same associated with yet still another embodiment of the present disclosure.

The passive containment building cooling system 700 illustrated in FIG. 18 is a modified exampled of the passive containment building cooling system 600 illustrated in FIG. 17. As illustrated in FIG. 17, the passive containment building cooling system 700 in FIG. 18 is also provided with a plurality of plate type heat exchangers 720 to mitigate a bottleneck phenomenon at the inlet.

The installation location of the plate type heat exchangers 720 may be an atmosphere region within the containment building 71, and a cooling water storage section 730 for collecting condensate is installed at a lower section of the plurality of plate type heat exchangers 720, respectively.

Figure 19:
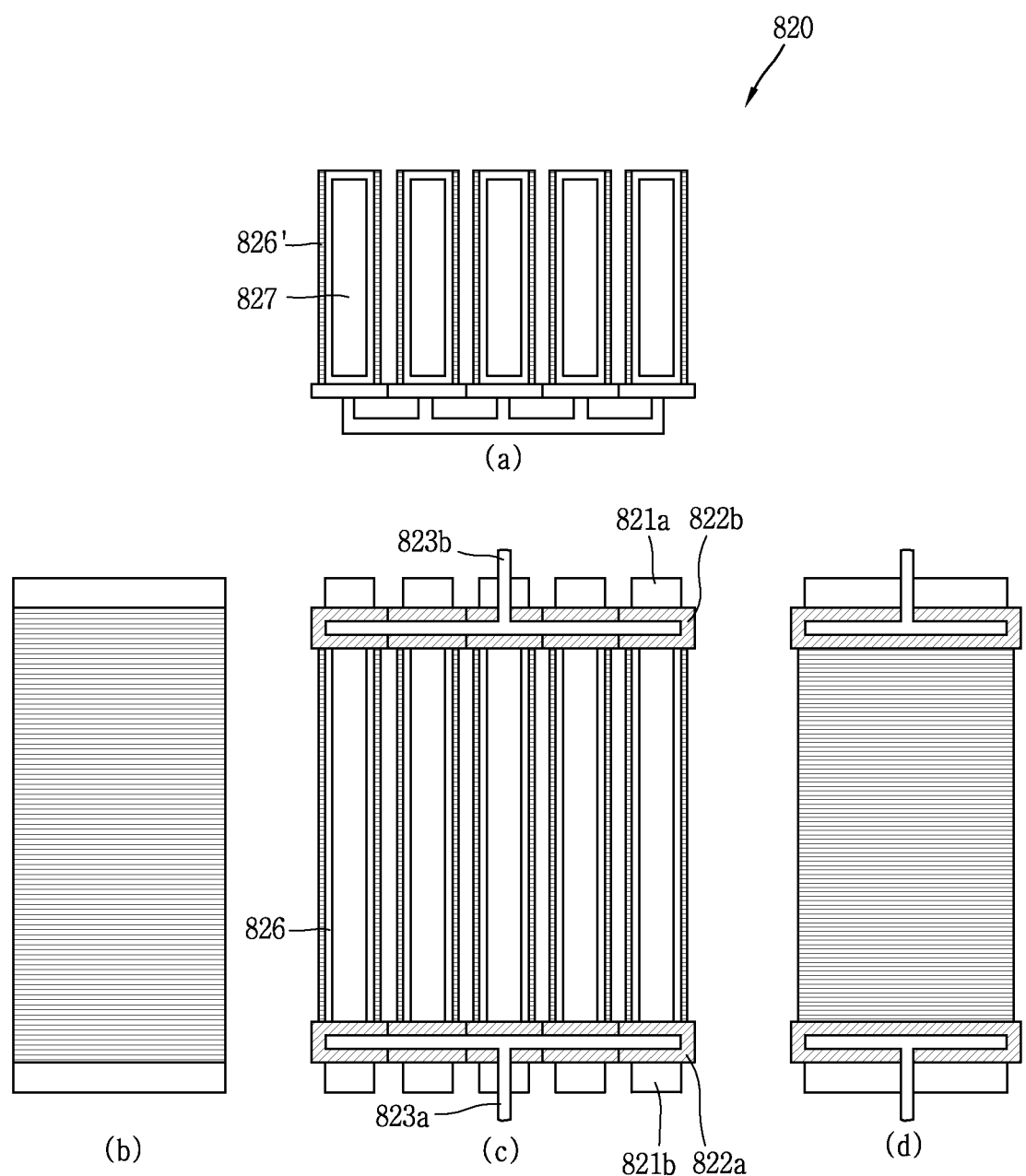
FIG. 19 is a conceptual view illustrating a plurality of plate type heat exchangers selectively applicable to the passive containment building cooling system in FIGS. 17 and 18.

FIG. 19 is a conceptual view illustrating a plurality of plate type heat exchangers 820 selectively applicable to the passive containment building cooling system 600, 700 in FIGS. 17 and 18.

FIGS. 19A, 19B, 19C and 19D illustrate a plan view, a left side view, a front view, and a right side view of the plurality of plate type heat exchangers 820, respectively. The plate type heat exchangers 820 is surrounded by a casing 826, respectively, and a cooling fin 826' is installed at the casing 8826.

The heat exchange fluid supplied from the emergency fluid storage section is distributed to each plate type heat exchanger 820 through an inlet connection line 823a', and the heat exchange fluids that have passed the plate type heat exchanger 820 is joined at an outlet connection line 823b' and returned again to the emergency fluid storage section. The heat exchange fluid continuously cools atmosphere within the containment building and suppresses a pressure increase within the containment building while circulating the emergency fluid storage section and plate type heat exchanger 820.

Figure 20:
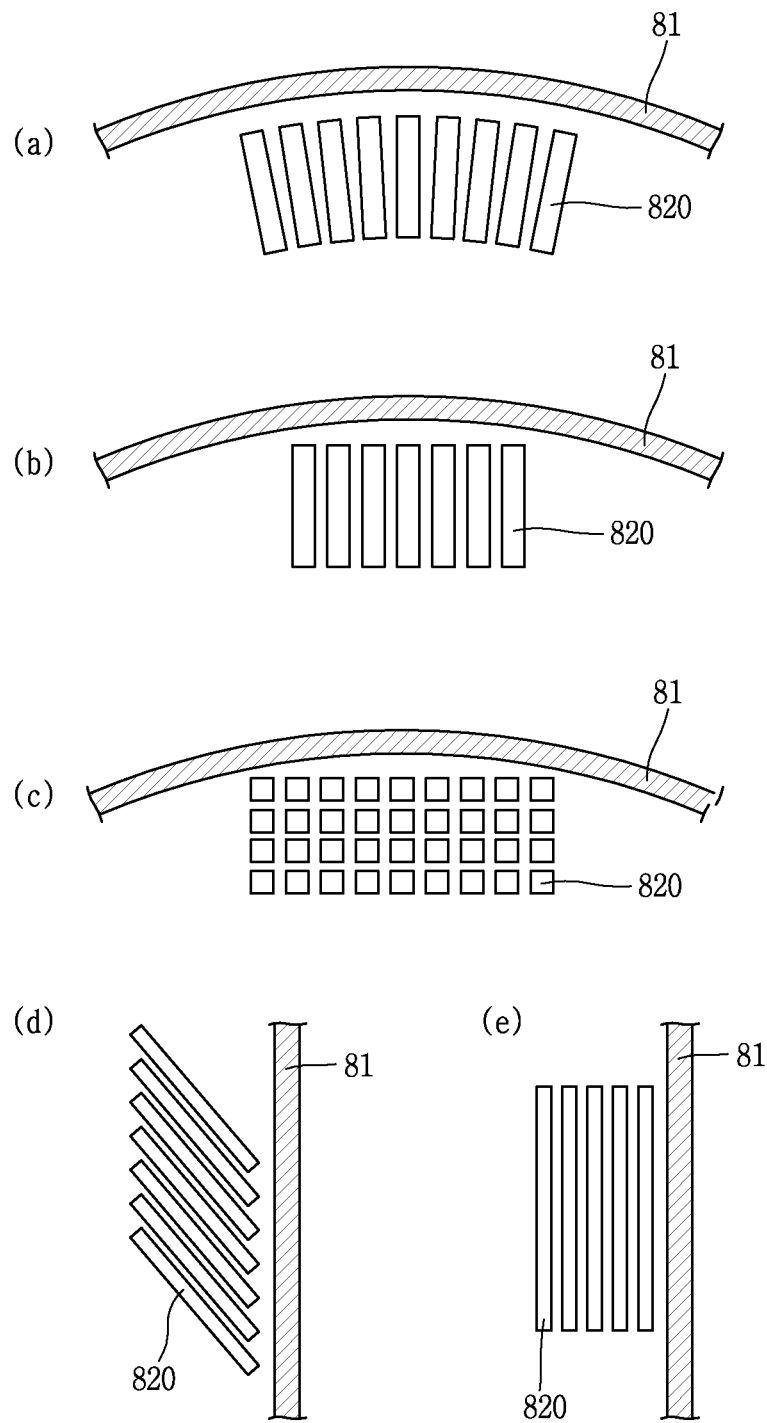
FIG. 20 is a layout conceptual view illustrating a plurality of plate type heat exchangers illustrated in FIG. 19.

FIG. 20 is a layout conceptual view illustrating a plurality of plate type heat exchangers 820 illustrated in FIG. 19.

Referring to FIG. 20A, a plurality of plate type heat exchangers 820 may be disposed to be separated from one another to correspond to a curved shape of the containment building 81.

Referring to FIG. 20B, a plurality of plate type heat exchangers 820 may be formed in a rectangular shape and arranged in one column.

Referring to FIG. 20C, a plurality of plate type heat exchangers 820 may be formed in a cubic shape and arranged in vertical and horizontal directions.

Referring to FIG. 20D, a plurality of plate type heat exchangers 820 may be arranged in an inclined manner to a side wall of the containment building 81.

Referring to FIG. 20E, a plurality of plate type heat exchangers 820 may be arranged in parallel to a side wall of the containment building 81.

The configurations and methods according to the above-described embodiments will not be applicable in a limited way to the foregoing passive containment building cooling system and a nuclear power plant including the same, and all or part of each embodiment may be selectively combined and configured to make various modifications thereto.

The present disclosure may be used to enhance the performance of a passive containment building cooling system in the nuclear power plant industry.

What is claimed is:

1. A passive containment building cooling system, comprising:
   a containment building;
   an emergency fluid storage section positioned outside the containment building and configured to store heat exchange fluid therein;
   a plurality of plate-type heat exchanger positioned inside the containment building, each plate-type heat exchanger comprising containment atmosphere flow path channels configured to flow containment atmosphere along one side of a plate of the heat exchanger and fluid flow path channels configured to flow the heat exchange fluid along the other side of the plate of the heat exchanger; and
   a line passing through the containment building and configured to supply the heat exchange fluid from the emergency fluid storage section to the fluid flow path channels of the plurality of plate-type heat exchangers and return the heat exchanger fluid to the emergency fluid storage section,
   wherein the plurality of plate-type heat exchangers are connected in parallel along the line via an inlet header connected between the line and an inlet region of each fluid flow path channel and an outlet header connected between an outlet region of each fluid flow path channel and the line,
   wherein the plurality of plate-type heat exchangers are connected in parallel to an inside of the containment building and each plate-type heat exchanger comprises an inlet guide configured to receive the containment atmosphere from the inside of the containment building and direct the containment atmosphere to the containment atmosphere flow path channels and an outlet guide configured to return the containment atmosphere from the atmosphere flow path channels to the inside of the containment building, and
   wherein the plurality of plate-type heat exchangers are arranged adjacent to one another and each plate-type heat exchanger further comprises a casing configured to cool containment atmosphere passing through an intermediate flow path defined by spaces between adjacent plate-type heat exchangers.

2. The passive containment building cooling system of claim 1, wherein each of the fluid flow path channels further comprises:
   a main heat transfer region connected between the inlet region and the outlet region, and having a flow resistance smaller than that of the inlet region.

3. The passive containment building cooling system of claim 2, wherein the inlet region is formed with a smaller width than that of the main heat transfer region, and has a length greater than a straight length of the main transfer region in a longitudinal direction of the plate type heat exchanger.

4. The passive containment building cooling system of claim 1, wherein the heat exchange fluid comprises atmosphere outside the containment building, and the passive containment building cooling system is configured to cool atmosphere within the containment building in an air cooling manner using the atmosphere outside the containment building.

5. The passive containment building cooling system of claim 1, wherein a longer direction of the plate corresponds to a longitudinal direction of the plate type heat exchanger, and a shorter direction of the plate corresponds to the lateral direction of the plate type heat exchanger,
- at least one of the inlet header and the outlet header is positioned at a first side surface of the plate type heat exchanger, parallel to the longitudinal direction thereof or positioned at a second side surface of the plate type heat exchanger facing away from the first side surface, and
- the passive containment building cooling system further comprises a common header which is connected to the inlet header and all the channels, or connected to the outlet header and all the channels.

6. The passive containment building cooling system of claim 1, wherein
- a longer direction of the plate corresponds to a longitudinal direction of the plate type heat exchanger, and a shorter direction of the plate corresponds to the lateral direction of the plate type heat exchanger, and
- the atmosphere flow path channels comprise:
- a first atmosphere flow path channel connected between a top surface and a bottom surface of the plate type heat exchanger orthogonal to the longitudinal direction thereof; and
- a second atmosphere flow path channel connected between a first side surface of the plate type heat exchanger parallel to the longitudinal direction thereof and a second side surface of the plate type heat exchanger facing away from the first side surface to intersect with the first atmosphere flow path channel.

7. The passive containment building cooling system of claim 1, wherein the passive containment building cooling system further comprises:
- a coolant storage section installed below the plate type heat exchanger to collect condensate formed by the plate type heat exchanger, and connected to a safety injection line to inject the collected condensate to the reactor coolant system; and
- a condensate return line extended from the plate type heat exchanger to the coolant storage section to allow atmosphere within the containment building to transfer heat from the plate type heat exchanger to the fluid and guide condensate formed by condensation to the cooling water storage section.

8. The passive containment building cooling system of claim 1,
- wherein a longer direction of the plate corresponds to a longitudinal direction of the plate type heat exchanger, and a shorter direction of the plate corresponds to a lateral direction of the plate type heat exchanger,
- wherein the atmosphere flow path channels or the fluid flow path channels are formed in the longitudinal direction of the plate type heat exchanger, and
- the plate type heat exchanger further comprises an open type flow path that is formed on the plate type heat exchanger in the lateral direction thereof and wherein said flow path is configured to communicate with the channels to allow atmosphere or heat exchange fluid passing through the open type flow path to join atmosphere or heat exchange fluid passing through the channels.

* * * * *